(12) United States Patent
Tanaka et al.

(10) Patent No.: US 8,121,554 B2
(45) Date of Patent: Feb. 21, 2012

(54) RADIO APPARATUS

(75) Inventors: Yasuhiro Tanaka, Ichinomiya (JP); Seigo Nakao, Yokosuka (JP); Ken Nakaoka, Ichinomiya (JP); Akifumi Hirata, Gifu (JP); Kiyoshige Ito, Gifu (JP); Yoshiyuki Otani, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 895 days.

(21) Appl. No.: 11/988,139

(22) PCT Filed: Jun. 26, 2006

(86) PCT No.: PCT/JP2006/312736
§ 371 (c)(1),
(2), (4) Date: Mar. 10, 2008

(87) PCT Pub. No.: WO2007/004461
PCT Pub. Date: Jan. 11, 2007

(65) Prior Publication Data
US 2009/0036062 A1 Feb. 5, 2009

(30) Foreign Application Priority Data

Jul. 1, 2005 (JP) ................................. 2005-194073

(51) Int. Cl.
*H04B 7/00* (2006.01)
(52) U.S. Cl. ........................................................ 455/69
(58) Field of Classification Search ................ 455/69
See application file for complete search history.

(56) References Cited

U.S. PATENT DOCUMENTS

| 6,072,797 | A * | 6/2000 | Fletcher | 370/394 |
| 6,178,448 | B1 * | 1/2001 | Gray et al. | 709/224 |
| 2002/0122437 | A1 * | 9/2002 | Cioffi et al. | 370/509 |
| 2002/0137519 | A1 * | 9/2002 | Miyoshi et al. | 455/452 |
| 2008/0037474 | A1 * | 2/2008 | Niwano | 370/335 |

FOREIGN PATENT DOCUMENTS

| JP | 2000-49663 | 2/2000 |
| JP | 2000-307478 | 11/2000 |
| JP | 2003-32745 | 1/2003 |
| JP | 2003-78893 | 3/2003 |
| JP | 2003-179966 | 6/2003 |
| JP | 2004-129085 | 4/2004 |
| JP | 2004-274103 | 9/2004 |
| JP | 2004-295375 | 10/2004 |
| JP | 2005-142735 | 6/2005 |
| WO | WO 99/55112 | 10/1999 |
| WO | WO0241530 | 5/2002 |
| WO | WO 2004/004173 A1 | 1/2004 |
| WO | WO 2004/071045 A1 | 8/2004 |

OTHER PUBLICATIONS

Martin, J., Nilsson, A., Congestion Control in HPR, Global Telecommunications Conference, 1997. Globecom '97., IEEE vol. 3, pp. 1881-1885.*

(Continued)

*Primary Examiner* — Temesgh Ghebretinsae
*Assistant Examiner* — Gennadiy Tsvey
(74) *Attorney, Agent, or Firm* — McDermott Will & Emery LLP

(57) ABSTRACT

A data rate is to be determined depending on circumstances. A control unit (30) transmits, at a predetermined frequency, a request signal by which to supply information on a data rate to a targeted radio apparatus compatible with a variable data rate. The control unit (30) receives rate information from the targeted radio apparatus. The control unit (30) sets a data rate used in the case of transmitting data, based on the information on a data rate contained in the rate information. The control unit (30) identifies the reliability level of the data rate contained in the rate information. And when the reliability level is low, the control unit (30) lowers the frequency at which the rate request signal is transmitted.

6 Claims, 23 Drawing Sheets

OTHER PUBLICATIONS

International Preliminary Report on Patentability issued in International Patent Application No. PCT/JP2006/312736, mailed on Sep. 12, 2006.

Coleri, S., et al., "Channel Estimation Techniques Based on Pilot Arrangement in OFDM Systems", IEEE Transactions on Broadcasting, Sep. 2002, pp. 223-229, vol. 48 No. 3, IEEE.

Namkamura, Y., et al., "MIMO-OFDM ni Okeru Channel Oyobi Shuhasu Offset no Suitei", Technical Report of IEICE, Aug. 27, 2004, pp. 79-84, vol. 104 No. 258, The Institute of Electronics Information and Communication Engineers.

Japanese Office Action, with English translation, issued in Japanese Patent Application No. 2007-523939, mailed Jul. 27, 2010.

* cited by examiner

FIG.3A

| LegacySTS | LegacyLTS | Legacy SIGNAL | MIMO SIGNAL | 1ST MIMO-STS | 1ST MIMO-LTS | 1ST DATA |

| 2ND MIMO-STS | 2ND MIMO-LTS | 2ND DATA |

FIG.3B

| LegacySTS | LegacyLTS | Legacy SIGNAL | MIMO SIGNAL | 1ST MIMO-STS | 1ST MIMO-LTS | 1ST DATA |

| 2ND MIMO-STS | 2ND MIMO-LTS | 2ND DATA |

| 3RD MIMO-STS | 3RD MIMO-LTS |

| 4TH MIMO-STS | 4TH MIMO-LTS |

FIG.3C

| LegacySTS | LegacyLTS | Legacy SIGNAL | MIMO SIGNAL | 1ST MIMO-STS | 1ST MIMO-LTS | 1ST DATA |

| 2ND MIMO-STS | 2ND MIMO-LTS | 2ND DATA |

| 3RD MIMO-LTS |

FIG.16A

| L-STS | L-LTS | L-SIGNAL | MIMO SIGNAL | 1ST MIMO-STS | 1ST MIMO-LTS | 1ST DATA |
|---|---|---|---|---|---|---|
| | | | | 2ND MIMO-STS | 2ND MIMO-LTS | 2ND DATA |
| | | | | 3RD MIMO-STS | 3RD MIMO-LTS | |
| | | | | 4TH MIMO-STS | 4TH MIMO-LTS | |

FIG.16B

| L-STS | L-LTS | L-SIGNAL | MIMO SIGNAL | 1ST MIMO-STS | 1ST MIMO-LTS' | 1ST DATA' |
|---|---|---|---|---|---|---|
| | | | | 2ND MIMO-STS | 2ND MIMO-LTS' | 2ND DATA' |
| | | | | 3RD MIMO-STS | 3RD MIMO-LTS' | 3RD DATA' |
| | | | | 4TH MIMO-STS | 4TH MIMO-LTS' | 4TH DATA' |

FIG.17

| L-STS | L-LTS | L-SIGNAL | MIMO SIGNAL | 1ST MIMO-STS' | 1ST MIMO-LTS' | 4TH MIMO-LTS' | 1ST DATA' |
|---|---|---|---|---|---|---|---|
| | | | | 2ND MIMO-STS' | 2ND MIMO-LTS' | 5TH MIMO-LTS' | 2ND DATA' |
| | | | | 3RD MIMO-STS' | 3RD MIMO-LTS' | 6TH MIMO-LTS' | 3RD DATA' |

RADIO APPARATUS

RELATED APPLICATIONS

This application is the U.S. National Phase under 35 U.S.C. §371 of International Application No. PCT/JP2006/312736 filed on Jun. 26, 2006, which in turn claims the benefit of Japanese Application No. 2005-194073, filed on Jul. 1, 2005, the disclosures of which Applications are incorporated by reference herein.

TECHNICAL FIELD

The present invention relates to a transmission technique and a communication technique and more particularly to a radio apparatus that performs communication by varying a data rate.

BACKGROUND TECHNOLOGY

An OFDM (Orthogonal Frequency Division Multiplexing) modulation scheme is one of multicarrier schemes that can realize the high-speed data transmission and are robust in the multipath environment. This OFDM modulation scheme has been applied to the wireless standards such as IEEE802.11a,g and HIPERLAN/2. The burst signals in such a wireless LAN are generally transmitted through a channel environment that varies with time and are also subjected to the effect of frequency selective fading. Hence, a receiving apparatus generally carries out the channel estimation dynamically.

In order for the receiving apparatus to carry out the channel estimation, two kinds of known signals are provided within a burst signal. One is the known signal, provided for all carriers in the beginning of the burst signal, which is the so-called preamble or training signal. The other one is the known signal, provided for part of carriers in the data area of the burst signal, which is the so-called pilot signal (See Nonpatent Document 1, for instance).

[Nonpatent Document 1] Sinem Coleri, Mustafa Ergen, Anuj Puri and Ahmad Bahai, "Channel Estimation Techniques Based on Pilot Arrangement in OFDM Systems", IEEE Transactions on broadcasting, vol. 48, No. 3, pp. 223-229, September 2002.

DISCLOSURE OF THE INVENTION

Problems to be Solved by the Invention

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and channels corresponding respectively to the antennas are set. That is, channels up to the maximum number of antennas are set for the communications between the transmitting apparatus and the receiving apparatus so as to increase the data rates. Moreover, combining this MIMO system with a technique such as the OFDM modulation scheme results in a higher data rate.

In the MIMO system, the data rate can also be adjusted by increasing or decreasing the number of antennas to be used for data communications. Furthermore, the data rate can be adjusted in greater detail by applying the adaptive modulation thereto. To perform such an adjustment of data rates more reliably it is desired that the transmitting apparatus acquire from the receiving apparatus the information on data rates suited for the radio channel between the transmitting apparatus and the receiving apparatus (hereinafter referred to as "rate information"). At the same time, the transmitting apparatus transmits to the receiving apparatus a signal by which to request the transmission of the rate information (hereinafter referred to as "rate request signal").

Examples of the combinations of directivity patterns in the transmitting apparatus and receiving apparatus in a MIMO system are as follows. One example is a case where the antennas of a transmitting apparatus have omni patterns and the antennas of a receiving apparatus have patterns in adaptive array signal processing. Another example is a case where both the antennas of the transmitting apparatus and those of the receiving apparatus have patterns in adaptive array signal processing. The system can be simplified in the former case. In the latter case, however, the directivity patterns of antennas can be controlled in greater detail, so that the characteristics thereof can be improved. Since in the latter case the transmitting apparatus performs adaptive array signal processing for transmission, it is necessary that known signals for use in channel estimation be received beforehand from the receiving apparatus. To improve the accuracy of controlling the adaptive array antennas, it is desirable that the transmitting apparatus acquire the respective channel characteristics between a plurality of antennas contained in the transmitting apparatus and those contained in the receiving apparatus. For this reason, the receiving apparatus transmits the known signals for channel estimation from all of the antennas. In what is to follow, the known signals, for use in channel estimation, transmitted from a plurality of antennas will be called "training signals" independently of the number of antennas to be used for data communication.

Under these circumstances, the inventors of the present invention came to recognize the following problems to be solved. If error is contained in the rate information determined by the receiving apparatus, error will be caused in communications by a MIMO system and the transmission quality and effective data rate will deteriorate. Thus, the determination of rate information by the receiving apparatus needs to be done with accuracy. On the other hand, the accuracy in determination of rate information differs for each receiving apparatus. That is, there are some receiving apparatuses that determine the rate information accurately whereas there are some receiving apparatuses that determine the rate information to a certain degree. In this case, if the data rate is set based on the latter rate information, there may be a possibility that the data transmitted at this data rate is erroneous. Also, even if the rate request signal is transmitted at a predetermined frequency, the transmission of a rate request signal will be useless if the transmitting apparatus receives only the rate information of low accuracy. Also, transmitting such a rate request signal deteriorates the frequency utilization efficiency.

The present invention has been made under the foregoing circumstances, and a general purpose is to provide a transmission technique and communication technique that determine a data rate depending on situations.

Means for Solving the Problems

A radio apparatus according to one embodiment comprises: a transmitter which transmits, at a predetermined frequency, a request signal by which to supply information on a data rate to a targeted radio apparatus compatible with a variable data rate; a receiver which receives from the targeted radio apparatus a response signal for the request signal transmitted from the transmitter wherein the response signal contains the information on a data rate; and a setting unit which sets a data rate used in the case of transmitting data from the transmitter, based on the data rate contained in the response signal received by the receiver. The transmitter identifies the level of reliability of the information on the data rate contained in the response signal received by the receiver, and lowers the frequency of transmitting the request signal when the level of reliability thereof is low.

The "predetermined frequency" may be determined by a timer, the transmitting/receiving of a certain kind of packet may be determined by a trigger, it may be determined by a certain kind of random time similar to DIFS (DCF Interface Space), or it may be determined by the timing that varies by a certain amount or above. That is, it is only necessary that the "predetermined frequency" is not to limited to a fixed interval but the transmission is done when a certain condition is met. Factors that determine the "data rate" are generally a modulation scheme, an error correction coding rate and the number of antennas used in a MIMO system. Here, the "data rate" may be an arbitrary combination of these or may be determined by one of these.

According to this embodiment, when the reliability level of the data rate is low, the need to receive the response signal from a radio apparatus associated with this is said to be low. Thus, the effective utilization of frequency can be achieved by reducing the frequency at which the request signal is transmitted.

The radio apparatus may further comprise an acquisition unit which acquires the degree of error of transmitted data when the data, whose data rate is set by the setting unit according to the information on the data rate contained in the response signal received by the receiver, is transmitted from the transmitter. The transmitter may identify the reliability level of the information on the data rate contained in the response signal received by the receiver, according to the degree of error acquired by the acquisition unit. In this case, the level of reliability is identified based on information on whether data was able to be transmitted normally or not, so that the identifying accuracy can be enhanced.

The radio apparatus may further comprise: a measurement unit which measures the quality of a radio channel between the radio apparatus and the targeted radio apparatus; and a derivation unit which derives a data rate suitable for the quality of a radio channel between the radio apparatus and the targeted radio apparatus, based on the quality of a radio channel measured by the measurement unit. The transmitter may identify the reliability level of the information on the date rate contained in the response signal received by the receiver, based on a difference between the information on the data rate contained in the response signal received by the receiver and the data rate derived by the derivation unit.

The "quality of a radio channel" is the quality of a radio line. This may be evaluated by arbitrary parameters and may include, for example, the signal strength, delay spread and interference amount. Also, the "quality of a radio channel" may be evaluated a combination of these. In such a case, the data rate derived by itself and the received data rate are compared with each other, so that whether the data rate is too high or too low can be identified in addition to the reliability level of the received data rate.

The radio apparatus may further comprise a derivation unit which derives a data rate based on information on a radio channel characteristic between the radio apparatus and the targeted radio apparatus, the information having been received by the receiver from the targeted radio apparatus. The transmitter may identify the reliability level of the information on the date rate contained in the response signal received by the receiver, based on a difference between the information on the data rate contained in the response signal received by the receiver and the data rate derived by the derivation unit. The "information on a radio channel characteristic" includes a response characteristic, delay profile and signal strength. In this case, the information on the data rate is derived by itself from the radio channel characteristics, and this information is used to derive the reliability level. Thus the identifying accuracy can be improved.

Another embodiment of the present invention relates also to a radio apparatus. This apparatus comprises: a transmitter which transmits a request signal by which to supply information on a data rate to a targeted radio apparatus compatible with a variable data rate; a receiver which receives from the targeted apparatus a response signal for the request signal transmitted from the transmitter wherein the response signal contains the information on a data rate; and a setting unit which sets a data rate used in the case of transmitting data from the transmitter, based on the information on the data rate contained in the response signal received by the receiver. The setting unit identifies the level of reliability of the information on the data rate contained in the response signal received by the receiver, and sets a data rate different from the data rate contained in the response signal when the level of reliability thereof is low.

According to this embodiment, when the reliability level of the data rate contained in the response signal is low, a data rate that differs from this is set, so that the possibility that the data suffers error can be reduced.

The radio apparatus may further comprise an acquisition unit which acquires the degree of error of transmitted data when the data, whose data rate is set by the setting unit according to the information on the data rate contained in the response signal received by the receiver, is transmitted from the transmitter. When the error acquired by the acquisition unit is larger than a threshold value, the setting unit may identify that the reliability level of the information on the data rate contained in the response signal received by the receiver is low, and set a data rate lower than the data rate contained in the response signal. In this case, the level of reliability is identified based on information on whether data was able to be transmitted or not, so that the identifying accuracy can be enhanced.

When a data rate lower than the data rate contained in the response signal is set by the setting unit, the transmitter may transmit the request signal. In this case, the request signal is transmitted along with the setting of a low data rate, so that the data rate suitable for the channel characteristics can be acquired and the period for setting the low data rate can be shortened.

The radio apparatus may further comprises: a measurement unit which measures the quality of a radio channel between the radio apparatus and the targeted radio apparatus; and a derivation unit which derives a data rate suitable for the quality of a radio channel between the radio apparatus and the targeted radio apparatus, based on the quality of a radio channel measured by the measurement unit. When a difference between the information on the data rate contained in the response signal received by the receiver and the data rate derived by the derivation unit is greater than a threshold value, the setting unit may identify that the information on the data rate contained in the response signal received by the receiver is low. In such a case, the data rate derived by itself and the received data rate are compared with each other, so that whether the data rate is too high or too low can be identified in addition to the reliability level of the received data rate.

The radio apparatus may further comprise a derivation unit which derives a data rate based on information on a radio channel characteristic between said radio apparatus and the targeted radio apparatus, the information having been received by the receiver from the targeted radio apparatus. When a difference between the information on the data rate contained in the response signal received by the receiver and the rate derived by the derivation unit is greater than a threshold value, the setting unit may identify that the information on the data rate contained in the response signal received by the receiver is low. In this case, the information on the data rate is derived by itself from the radio channel characteristics, and this information is used to derive the reliability level. Thus the identifying accuracy can be improved.

Still another embodiment of the present invention relates also to a radio apparatus. This apparatus comprises: a transmitter which transmits, at a predetermined frequency, a request signal by which to supply information on a data rate to a targeted radio apparatus compatible with a variable data rate; a receiver which receives from the targeted radio apparatus a response signal for the request signal transmitted from the transmitter wherein the response signal contains information on the data rate; and a setting unit which sets a data rate used in the case of transmitting data from the transmitter, based on the data rate contained in the response signal received by the receiver. When a variation in the data rate contained in the response signal received by the receiver is less than a predetermined threshold value, the transmitter lowers the frequency of transmitting the request signal.

According to this embodiment, if the variation in the rate information is small, a fixed data rate will be used for a certain period of time. Hence, even though the request signal for the data rte is transmitted, the transmission efficiency can be improved while the worsening of the characteristics is suppressed.

When the variation in the data rate contained in the response signal received by the receiver is greater than or equal to a predetermined threshold value, the transmitter may raise the frequency of transmitting the request signal. In this case, the frequency of transmitting the request signal is raised. This in turn can acquire the most recent data rate and improve the receiving characteristics.

Still another embodiment of the present invention relates also to a radio apparatus. This apparatus comprises: a transmitter which transmits, at a predetermined frequency, a request signal by which to supply information on a data rate to a targeted radio apparatus compatible with a variable data rate; a receiver which receives from the targeted radio apparatus a response signal for the request signal transmitted from the transmitter wherein the response signal contains information on the data rate; and a setting unit which sets a data rate used in the case of transmitting data from the transmitter, based on the data rate contained in the response signal received by the receiver. The transmitter acquires information on data to be transmitted to the targeted radio apparatus and determines transmission of the request signal according to the acquired information.

According to this embodiment, the request signal is transmitted according to the information on data to be transmitted. Thus the information on the data rate can be updated when necessary.

As the information on the data, the transmitter may acquire the amount of data to be transmitted, and may determine transmission of the request signal according to the acquired information when the acquired amount of data is greater than a threshold value. In this case, when the amount of data is large, the data rate can be set using the latest information. Thus, the transmission efficiency can be improved.

As the information on the data, the transmitter may acquire the degree of priority of data to be transmitted, and may determine transmission of the request signal according to the acquired information when the acquired priority degree of data is greater than a threshold value. In this case, when the degree of priority of data is high, the data rate can be set using the latest information. Thus, data with a high degree of priority can be transmitted with high probability.

When transmitting the request signal, the transmitter has the information on a desired rate when data are transmitted contained therein. The "information on a data rate" may be a data rate used when a transmitter performs transmission and may be information on the coding of video or audio transmitted by the transmitter. That is, the information may be such that how much data rate is finally requested by the transmitter can be recognized by a targeted radio apparatus. In this case, the rate request signal is transmitted in a manner that the information on a desired data rate in the case of transmitting the data is contained therein. Thus, the data rate appropriate for the targeted radio apparatus can be determined.

The transmitter may comprise: a plurality of antennas; and a generator which generates a packet signal to be transmitted from the plurality of antennas, the packet signal containing a plurality of streams. When transmitting the request signal, the generator may generate the packet signal in a manner such that known signals are contained in streams the number of which is greater than or equal to the number of streams that contain data. In this case, the known signals are transmitted from the plurality of antennas and the channel characteristics formed by a combination of transmitting-side antennas and receiving-side antennas are formed. Thus the data rate can be determined with accuracy.

Still another embodiment of the present invention relates also to a radio apparatus. This apparatus comprises: a receiver which receives a broadcasting signal transmitted from a targeted radio apparatus compatible with a variable data rate; a decision unit which determines a data rate used at the time when data are received in the receiver, based on the broadcasting signal received by the receiver; and a transmitter which transmits to the targeted radio apparatus a request signal with which to start a communication in a manner that the data rate determined by the decision unit is contained as information.

According to this embodiment, the data rate is determined at the stage of the broadcasting signal, and the thus determined data rate is used when a communication is started. Thus, the data rate suitable for the channel characteristics can be used from the beginning of the communication.

Still another embodiment of the present invention relates also to a radio apparatus. This apparatus comprises: a receiver which receives a broadcasting signal transmitted from a targeted radio apparatus compatible with a variable data rate; a decision unit which determines a data rate used at the time when data are received by the receiver, based on the broadcasting signal received by the receiver; and a transmitter which transmits to the targeted radio apparatus a signal necessary for starting a communication in a manner that the data rate determined by the decision unit is contained as information.

According to this embodiment, the data rate is determined at the stage of the broadcasting signal, and the thus determined data rate is used when a communication is started. Thus, the data rate suitable for the channel characteristics can be used from the beginning of the communication.

Still another embodiment of the present invention relates also to a radio apparatus. This apparatus comprises: a receiver which receives a request signal indicating that transmission of information on a data rate is requested, from a targeted radio apparatus compatible with a variable data rate; and a transmitter which transmits to the targeted radio apparatus a response signal for the request signal received by the receiver wherein the response signal contains the information on a data rate. The receiver derives the quality of a radio channel between the radio apparatus and the targeted radio apparatus; and even when the receiver has not received the request signal, the transmitter transmits the response signal to the targeted radio apparatus according to the quality derived by the receiver.

According to this embodiment, the response signal is transmitted even when the rate request signal has not been received, so that the data rate can be actively varied according to the receiving state in the targeted radio apparatus.

Still another embodiment of the present invention relates also to a radio apparatus. This apparatus comprises: a receiver which receives a request signal indicating that transmission of information on a data rate is requested, from a targeted radio apparatus compatible with a variable data rate; and a transmitter which transmits to the targeted radio apparatus a response signal for the request signal received by the receiver wherein the response signal contains the information on a data rate. The receiver measures a period of time elapsed from when the request signal has been received; and even when the receiver has not received the request signal, the transmitter transmits the response signal to the targeted radio apparatus according to the period of time measured by the receiver.

According to this embodiment, the response signal is transmitted even when the rate request signal has not been received, so that the data rate can be actively varied according to the receiving state in the targeted radio apparatus.

The radio apparatus may further comprise an identifying unit which identifies the data rate, based on the request signal received by the receiver. The receiver may receives packet signals transmitted from a plurality of antennas provided in the targeted radio apparatus wherein the packet signal contains a signal of a plurality of streams; and in the packet signal where known signals are contained in streams the number of which is greater than or equal to the number of streams that contain data, the identifying unit may identify the data rate as the request signal, based on the known signals. In this case, the known signals are transmitted from the plurality of antennas and the channel characteristics formed by a combination of transmitting-side antennas and receiving-side antennas are estimated. Thus the data rate can be determined with accuracy.

Still another embodiment of the present invention relates also to a radio apparatus. This apparatus comprises: a receiver which receives a request signal indicating that transmission of information on a data rate is requested, from a targeted radio apparatus compatible with a variable data rate; a generator which generates information on a data rate which is to correspond to the request signal received by the receiver; and a transmitter which transmits to the targeted radio apparatus a response signal for the request signal received by the receiver wherein the response signal contains the information generated by the generator. The generator generates information on reliability of the generated information on a data rate, and the transmitter has the information on reliability contained in the response signal.

According to this embodiment, the information on the reliability level is transmitted, too. Thus, more detailed data rate can be set.

Still another embodiment of the present invention relates to a transmission method. This method is a method for transmitting, at a predetermined frequency, a request signal by which to supply information on a data rate to a targeted radio apparatus compatible with a variable data rate, and the method is such that: a response signal for the request signal transmitted is received from the targeted radio apparatus wherein the response signal contains the information on a data rate; a data rate used in the case of transmitting data is set based on the data rate contained in the received response signal; and the level of reliability of the information on the data rate contained in the received response signal is identified and the frequency of transmitting the request signal is lowered when the level of reliability thereof is low.

Still another embodiment of the present invention relates also to a transmission method. This method is a method for transmitting a request signal by which to supply information on a data rate to a targeted radio apparatus compatible with a variable data rate, for receiving from the targeted apparatus a response signal for the request signal transmitted wherein the response signal contains the information on a data rate, and for setting a data rate used in the case of transmitting data, based on the information on the data rate contained in the received response signal, and the method is such that the level of reliability of the information on the data rate contained in the received response signal is identified and a data rate different from the data rate contained in the response signal is set when the level of reliability thereof is low.

Still another embodiment of the present invention relates also to a transmission method. This method comprises: transmitting, at a predetermined frequency, a request signal by which to supply information on a data rate to a targeted radio apparatus compatible with a variable data rate; receiving a response signal for the transmitted request signal from the targeted radio apparatus wherein the response signal contains the information on a data rate; setting a data rate used in the case of transmitting data, based on the data rate contained in the received response signal; and identifying the level of reliability of the information on the data rate contained in the received response signal, and lowering the frequency of transmitting the request signal when the level of reliability thereof is low.

The method may further comprise acquiring the degree of error of transmitted data when data, whose data rate is set according to the information on the data rate contained in the received response signal, is transmitted. The lowering may identify the reliability level of the information on the data rate contained in the received response signal, according to the acquired degree of error. The method may further comprise: measuring the quality of a radio channel between a radio apparatus and the targeted radio apparatus; and deriving a data rate suitable for the quality of a radio channel between the radio apparatus and the targeted radio apparatus, based on the measured quality of a radio channel. The lowering may identify the reliability level of the information on the date rate contained in the received response signal, based on a difference between the information on the data rate contained in the received response signal and the derived data rate.

Still another embodiment of the present invention relates also to a transmission method. This method comprises: transmitting a request signal by which to supply information on a data rate to a targeted radio apparatus compatible with a variable data rate; receiving from the targeted apparatus a response signal for the request signal transmitted wherein the response signal contains the information on a data rate; and setting a data rate used in the case of transmitting data, based on the information on the data rate contained in the received response signal. The setting is such that the level of reliability of the information on the data rate contained in the received response signal is identified and a data rate different from the data rate contained in the response signal is set when the level of reliability thereof is low.

The method may further comprise acquiring the degree of error of transmitted data when the data, whose data rate is set according to the information on the data rate contained in the received response signal, is transmitted. When the error acquired is larger than a threshold value, the setting may identify that the reliability level of the information on the data rate contained in the received response signal is low, and set a data rate lower than the data rate contained in the response signal. The method may further comprise measuring the quality of a radio channel between a radio apparatus and the targeted radio apparatus; and deriving a data rate suitable for the quality of a radio channel between the radio apparatus and the targeted radio apparatus, based on the measured quality of a radio channel. When a difference between the information on the data rate contained in the received response signal and the derived data rate is greater than a threshold value, the setting may identify that the information on the data rate contained in the received response signal is low.

The transmitting includes generating a packet signal to be transmitted from a plurality of antennas wherein the packet signal contains a plurality of streams. When the request signal is transmitted, the generating may generate the packet signal in a manner such that known signals are contained in streams the number of which is greater than or equal to the number of streams that contain data.

Still another embodiment of the present invention relates to a communication method. This method comprises: receiving a broadcasting signal transmitted from a targeted radio apparatus compatible with a variable data rate; determining a data rate used at the time when data are received, based on the received broadcasting signal; and transmitting to the targeted radio apparatus a request signal with which to start a communication in a manner that the determined data rate is contained as information.

Still another embodiment of the present invention relates also to a communication method. This method is a method for receiving a request signal indicating that transmission of information on a data rate is requested, from a targeted radio apparatus compatible with a variable data rate and for transmitting to the targeted radio apparatus a response signal for the received request signal wherein the response signal contains the information on a data rate, and the method is such that: the quality of a radio channel between a radio apparatus and the targeted radio apparatus is derived; and even when the request signal has not been received, the response signal is transmitted to the targeted radio apparatus according to the derived quality.

Still another embodiment of the present invention relates also to a communication method. This method is a method for receiving a request signal indicating that transmission of information on a data rate is requested, from a targeted radio apparatus compatible with a variable data rate and for transmitting to the targeted radio apparatus a response signal for the received request signal wherein the response signal contains the information on a data rate, and the method is such that: a period of time elapsed from when the request signal has been received is measured; and even when the request signal has not been received, the response signal is transmitted to the targeted radio apparatus according to the measured period of time.

Packet signals transmitted from a plurality of antennas provided in the targeted radio apparatus may be received wherein the packet signals contains a signal of a plurality of streams and, in the packet signal where known signals are contained in streams the number of which is greater than or equal to the number of streams that contain data, the data rate may be identified as the request signal, based on the known signals.

Still another embodiment of the present invention relates also to a communication method. This method comprises: transmitting, at a predetermined frequency, a request signal by which to supply information on a data rate to a targeted radio apparatus compatible with a variable data rate; receiving from the targeted radio apparatus a response signal for the transmitted request signal wherein the response signal contains information on the data rate; and setting a data rate used in the case of transmitting data, based on the data rate contained in the received response signal. When a variation in the data rate contained in the received response signal is less than a predetermined threshold value, the transmitting lowers the frequency of transmitting the request signal.

Still another embodiment of the present invention relates also to a communication method. This method comprises: transmitting, at a predetermined frequency, a request signal by which to supply information on a data rate to a targeted radio apparatus compatible with a variable data rate; receiving from the targeted radio apparatus a response signal for the transmitted request signal wherein the response signal contains information on the data rate; and setting a data rate used in the case of transmitting data, based on the data rate contained in the received response signal. The transmitting acquires information on data to be transmitted to the targeted radio apparatus and determines the transmission of the request signal according to the acquired information.

Still another embodiment of the present invention relates also to a communication method. This method comprises: receiving a broadcasting signal transmitted from a targeted radio apparatus compatible with a variable data rate; determining a data rate used in the case of receiving data, based on the received broadcasting signal; and transmitting to the targeted radio apparatus a signal necessary for starting a communication in a manner that the determined data rate t is contained as information.

Still another embodiment of the present invention relates also to a communication method. This method comprises: receiving a request signal indicating that transmission of information on a data rate is requested, from a targeted radio apparatus compatible with a variable data rate; generating information on a data rate which is to correspond to the received request signal; and transmitting to the targeted radio apparatus a response signal for the received request signal wherein the response signal contains the generated information. The generating generates information on reliability of the generated information on a data rate, and the transmitting has the information on reliability contained in the response signal.

Optional combinations of the aforementioned constituting elements, and implementations of the invention in the form of methods, apparatuses, systems, recording mediums, computer programs and so forth may also be effective as additional modes of the present invention.

Effect of the Invention

According to the present invention, the data rate can be decided depending on circumstances.

BRIEF DESCRIPTION OF THE DRAWINGS

FIGS. 3(a) to 3(c) each shows a structure of burst format in a communication system shown in FIG. 2.

FIGS. 16(a) and 16(b) each shows a structure of burst format of a burst signal generated by a transmitting apparatus shown in FIG. 15.

FIG. 17 shows another burst format of a burst signal generated by a transmitting apparatus shown in FIG. 15.

DESCRIPTION OF THE REFERENCE NUMERALS

Figure 1:
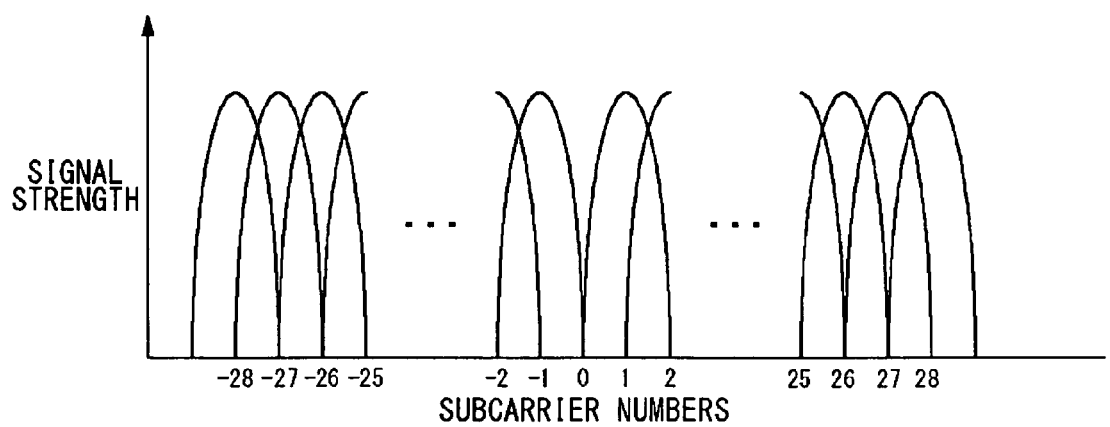
FIG. 1 shows a spectrum of a multicarrier signal according to a first exemplary embodiment of the present invention.

10 Radio apparatus, 12 Antenna, 14 Antenna, 20 Radio unit, 22 Processing unit, 24 Modem unit, 26 IF unit, 30 Control unit, 32 Rate information management unit, 100 Communication system.

BEST MODE FOR CARRYING OUT THE INVENTION

First Exemplary Embodiment

An outline of the present invention will be given before a detailed description thereof. A first exemplary embodiment relates to a MIMO system comprised of two radio apparatuses (hereinafter referred to as "first radio apparatus" and "second radio apparatus" for the sake of simplicity). Both the first radio apparatus and the second radio apparatus in the MIMO system execute adaptive array signal processing. The MIMO system varies the data rate by varying values corresponding respectively to the number of antennas, modulation scheme and coding rate of error correction. In so doing, a radio apparatus at the transmitting side transmits a rate request signal to a radio apparatus at the receiving side. For example, when the first radio apparatus transmits data to the second radio apparatus, the first radio apparatus transmits the rate request signal to the second radio apparatus. Here, the first radio apparatus sends the request signal at a predetermined frequency.

The second radio apparatus conveys rate information of its own to the first radio apparatus. The first radio apparatus sets a data rate based on the rate information notified from the second radio apparatus. However, the first radio apparatus is not aware of the degree of accuracy of the rate information determined by the second radio apparatus. If the degree of accuracy of the rate information is high, a data rate suitable for a radio channel will be achieved even if the first radio apparatus sets the data rate according to said rate information. If, on the other hand, the degree of accuracy of the rate information is low, for example, if information of a rate higher than a data rate suitable for the actual radio channel is conveyed, the setting of a data rate according to said rate information will raise the error event probability. As a result, the first radio apparatus sets a data rate different from the rate information. Under such a circumstance, the rate request signal transmitted to the second radio apparatus from the first radio apparatus will be no longer necessary. That is, the periodic transmission of the rate request signal will reduce the frequency utilization efficiency. In order to resolve such a problem as above, the first radio apparatus according to the present exemplary embodiment operates as follows.

The first radio apparatus transmits data to the second radio apparatus in accordance with the rate information, and identifies the level of reliability of the rate information. If the level of reliability of the rate information is high, the first radio apparatus will repeat the processing of transmitting the rate information and receiving the rate information at a predetermined frequency. If, on the other hand, the level of reliability thereof is low, the first radio apparatus will set a data rate different from the data rate in the rate information and send data. The first radio apparatus will reduce the frequency of transmitting the rate request signal.

FIG. 1 illustrates a spectrum of a multicarrier signal according to a first exemplary embodiment of the present invention. In particular, FIG. 1 shows a spectrum of a signal in an OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined. It is to be noted that the subcarrier number "0" is set to null so as to reduce the effect of a direct current component in a baseband signal.

The respective subcarriers are modulated by a modulation scheme which is set variably. Used here is any of modulation schemes among BPSK (Binary Phase Shift Keying), QPSK (Quadrature Phase Shift Keying), 16 QAM (Quadrature Amplitude Modulation) and 64 QAM.

As an error correction scheme, convolutional coding is used for these signals. The coding rates for the convolutional coding are set to ½, ¾ and so forth. The number of data to be transmitted in parallel is set variably. Note that data are transmitted as burst signals and each of the burst signals to be transmitted in parallel is called a "stream". As a result thereof, since the modulation scheme, the coding rate and the number of streams are set variably, the data rate is also set variably. As described above, information on data rates will be referred to as "rate information" hereinbelow, and the rate information contains values corresponding to a modulation scheme, a coding rate and streams. It is to be noted that the "data rate" may be determined by an arbitrary combination of these factors or by only one of them.

Figure 2:
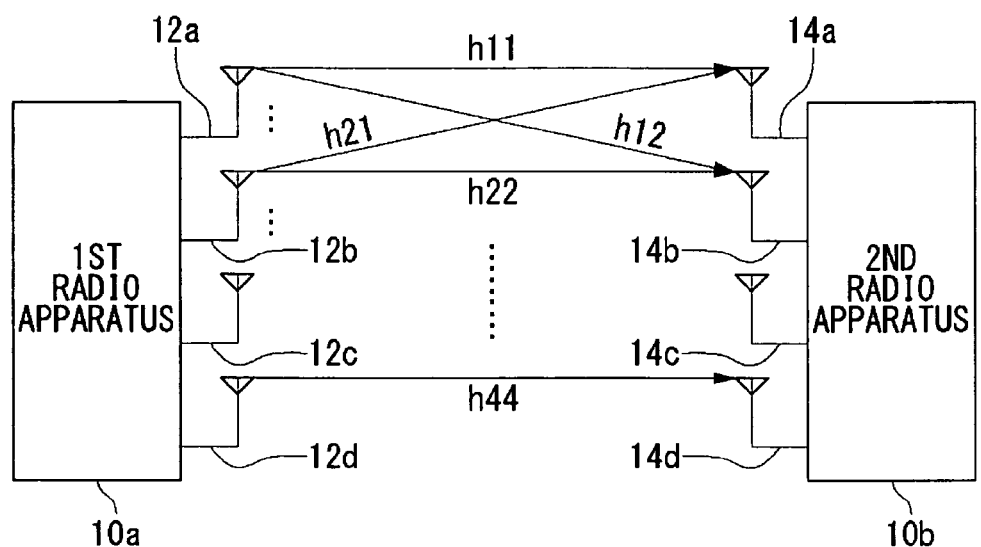
FIG. 2 shows a structure of a communication system according to a first exemplary embodiment of the present invention.

FIG. 2 illustrates a structure of a communication system 100 according to an exemplary embodiment of the present invention. The communication system 100 includes a first radio apparatus 10a and a second radio apparatus 10b, which are generically called radio apparatus 10. The first radio apparatus 10a includes a first antenna 12a, a second antenna 12b, a third antenna 12c and a fourth antenna 12d, which are generically referred to as antennas 12, and the second radio apparatus 10b includes a first antenna 14a, a second antenna 14b, a third antenna 14c and a fourth antenna 14d, which are generically referred to as antennas 14. Either one of the first radio apparatus 10a and the second radio apparatus 10b corresponds to a base station apparatus, whereas the other corresponds to a terminal apparatus.

An outline of a MIMO system will be explained before a description of a structure of the communication system 100 is given. Assume herein that data are being transmitted from the first radio apparatus 10a to the second radio apparatus 10b. The first radio apparatus 10a transmits respectively data of multiple streams from the first antenna 12a through the fourth antenna 12d, respectively. As a result, the data rate becomes higher. Note that the first radio apparatus 10a is compatible with MIMO eigenmode transmission. Accordingly, the first radio apparatus 10a derives an H matrix from a steering matrix, and transmits a plurality of data using the steering matrix. The second radio apparatus 10b receives the data of multiple streams by the first antenna 14a through the fourth antenna 14d. Further, the second radio apparatus 10b separates the received data by adaptive array signal processing and demodulates independently the data of multiple streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, the other channels are omitted in the Figure.

FIGS. 3A to 3C show each a structure of burst format in a communication system 100. FIG. 3A shows a burst format when the number of antennas 12 used is "2". The upper row of FIG. 3A shows a burst signal transmitted from the first antenna 12a whereas the lower row thereof shows a burst signal transmitted from the second antenna 12b. "Legacy STS (Short Training Sequence)", "Legacy LTS (Long Training Sequence)" and "Legacy Signal" are signals compatible with a communication system, such as a wireless LAN system conforming to the IEEE802.11a standard, which is not compatible with a MIMO. "Legacy STS" is used for timing synchronization, AGC (Automatic Gain Control) and the like; "Legacy LTS" is used for channel estimation; and "Legacy Signal" contains control information. "MIMO Signal" and the signals assigned posterior thereto are those inherent to a MIMO system, and the "MIMO Signal" contains control information corresponding to a MIMO system. "First MIMO-STS" and "Second MIMO-STS" are used for timing synchronization, AGC and the like; "First MIMO-LTS" and "Second MIMO-LTS" are used for channel estimation; and "First Data" and the "Second Data" are data to be transmitted.

Similar to FIG. 3(a), FIG. 3(b) shows a burst format at the time when "two" antennas 12 are used for data transmission. However, the above-described training signals are appended. In the Figure, the training signals correspond to a set of "First MIMO-STS" and "First MIMO-LTS" through a set of "Fourth MIMO-STS" and "Fourth MIMO-LTS". The set of "First MIMO-STS" and "First MIMO-LTS" through the set of "Fourth MIMO-STS" and "Fourth MIMO-LTS" are transmitted from the first antenna 12 through fourth antenna 12d, respectively. As mentioned earlier, the number of antennas 12 from which the training signals are transmitted may be less than "4".

"First MIMO-STS" to "Fourth MIMO-STS" are structured by patterns with which the interference among them becomes small. The same is true for "First MIMO-LTS" to "Fourth MIMO-LTS". The explanation of these structures thereof is omitted here. Though it may be generally a case that "Legacy LTS", "First MIMO-LTS" and the like in FIG. 3(a) are called training signals, the training signals defined herein are restricted to the aforementioned training signals as shown in FIG. 3(b). That is, "training signals" correspond to "MIMO-LTSs" having multiple streams the number of which corresponds to channels to be estimated, in order to have a targeted radio apparatus 10 estimate the channels, independently of the number of data to be transmitted, namely the number of streams. Hereinafter, the "First MIMO-STS" to "Fourth MIMO-STS" are generically referred to as "MIMO-STS"; the "First MIMO-LTS" to "Fourth MIMO-LTS" are generically referred to as "MIMO-LTS"; and "First Data" and "Second Data" are generically referred to as "Data".

FIG. 3(c) corresponds to a case where three MIMO-LTSs are assigned respectively to three antennas 12 and two Data are assigned respective to two antennas 12. Of "MIMO-LTSs", part thereof corresponding to the antennas 12 by which to transmit "MIMO-STS" and part thereof corresponding to antennas 12 other than those by which to transmit "MIMO-STS" are assigned to different timings. Here, the antennas 12 by which to transmit "MIMO-STS" are the first antenna 12a and the second antenna 12b.

Accordingly, parts corresponding to these are "First MIMO-LTS" and "Second MIMO-LTS". On the other hand, the antenna 12 other than those by which to transmit "MIMO-STS" is the third antenna 12c. Hence, part corresponding thereto is "third MIMO-LTS". As shown in the Figure, these are assigned in a manner that the timings are shifted. Note that it is defined such that "Third MIMO-LTS" must use all subcarriers. According to such a format as this, when "Second MIMO-LTS" is amplified by AGC, it is not affected by "Third MIMO-LTS". Hence, the channel can be further accurately estimated by these. In this case, too, the signal strength at the time "Data" are received is brought close to the signal strength at the time "MIMO-STS" is received when the gain of AGC is set. As a result, the worsening of the receiving quality due to the gain of AGC can be suppressed.

Figure 4:
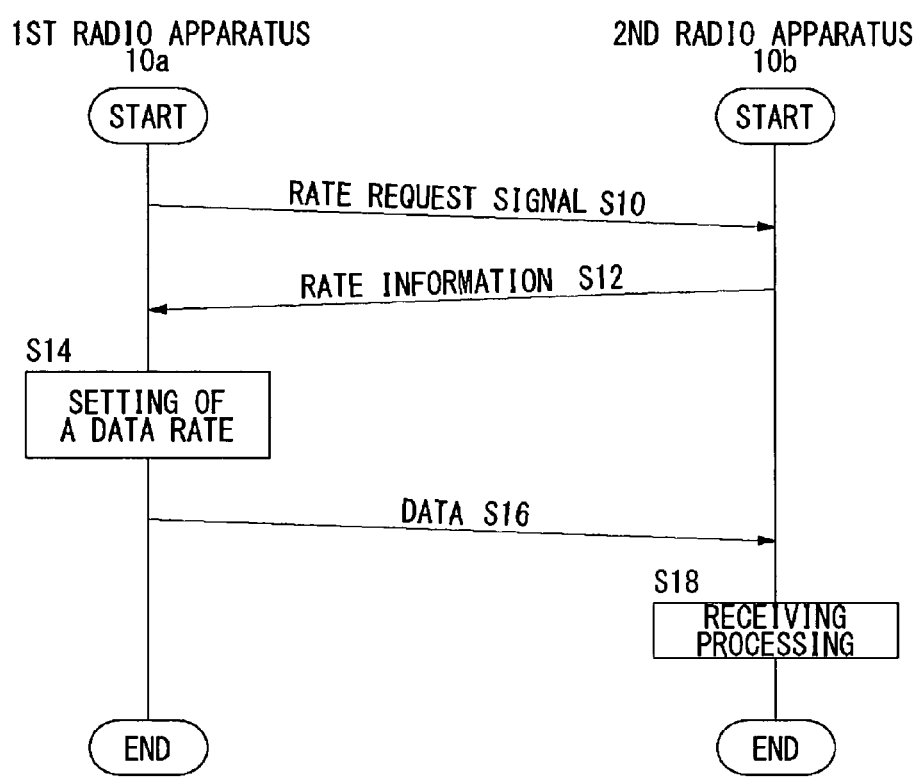
FIG. 4 is a sequence diagram showing a communication procedure in a communication system of FIG. 2.

FIG. 4 shows a sequence of communication procedure in the communication system 100. Shown here is an operation in which the first radio apparatus 10a acquires information on rates of the second radio apparatus 10b. For the brevity of explanation, the operation for adaptive array signal processing is omitted here. The first radio apparatus 10a sends a rate request signal to the second radio apparatus 10b (S10). The second radio apparatus 10b sends rate information to the first radio apparatus 10a (S12). The first radio apparatus 10a sets a data rate, based on the rate information (S14). That is, the data rate is set by referring to the rate information. The first radio apparatus 10a transmits data at the data rate thus set (S16). The second radio apparatus 10b performs a receiving processing on the data (S18).

Figure 5:
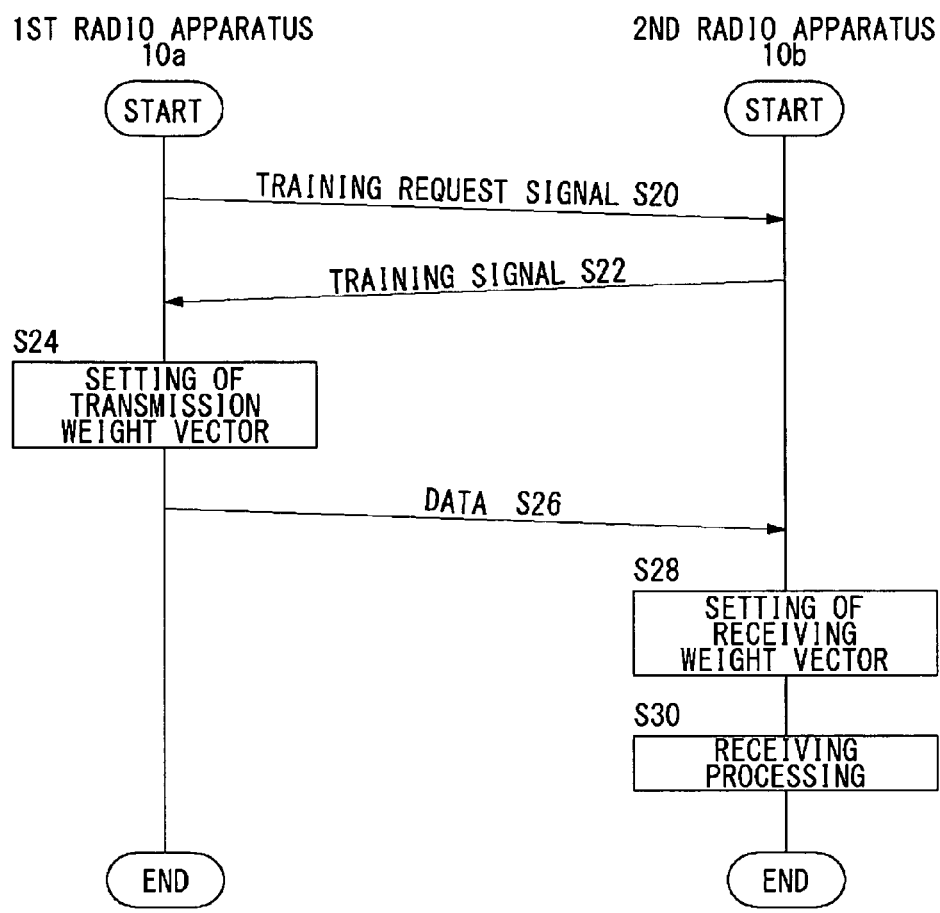
FIG. 5 is another sequence diagram showing a communication procedure in a communication system of FIG. 2.

FIG. 5 shows another sequence of communication procedure in the communication system 100. Shown here is an operation in which data are transmitted by MIMO. The first radio apparatus 10a sends a training request signal to the second radio apparatus 10b (S20). The training request signal is contained in "First Data" or "Second Data" of FIG. 3(a). The second radio apparatus 10b sends training signals to the first radio apparatus 10a (S22). The first radio apparatus 10a derives a transmission weight vector, based on the received training signal and sets this (S24). While using the transmission weight vector, the first radio apparatus 10a transmits Data (S26). The second radio apparatus 10b derives a receiving weight vector for the received Data, and sets this (S28). Further, the second radio apparatus 10b executes a receiving processing, based on the received weight vector (S30).

Figure 6:
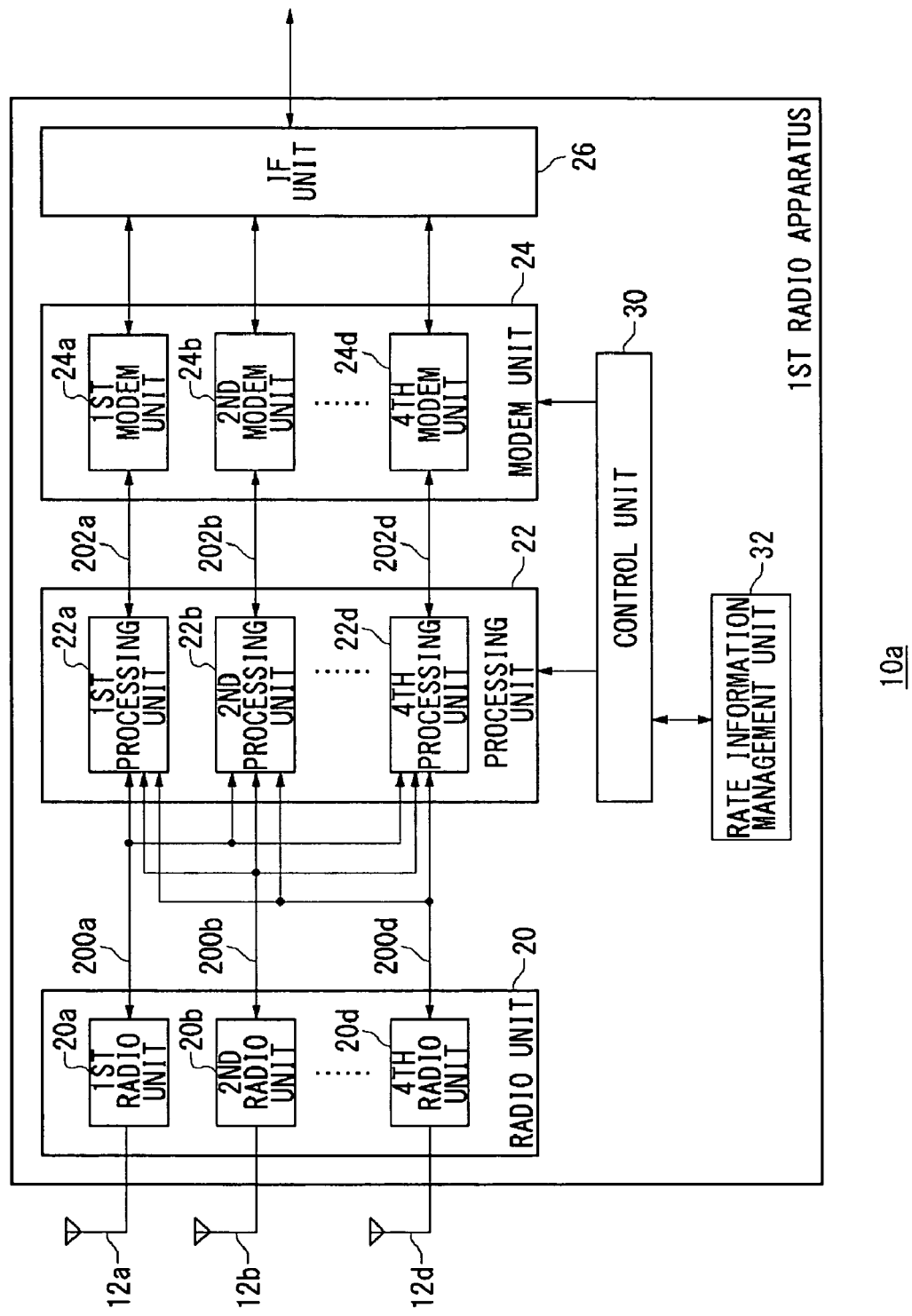
FIG. 6 shows a structure of a first radio apparatus shown in FIG. 2.

FIG. 6 illustrates a structure of a first radio apparatus 10a. The first radio apparatus 10a includes a first radio unit 20a, a second radio unit 20b, . . . and a fourth radio unit 20d, which are generically referred to as radio unit 20, a first processing unit 22a, a second processing unit 22b, . . . and a fourth radio 22d, which are generically referred to as processing unit 22, a first modem unit 24a, a second modem unit 24b, . . . and a fourth modem unit 24d, which are generically referred to as modem unit 24, an IF unit 26, a control unit 30, and a rate information managing unit 32. Signals involved include a first time-domain signal 200a, a second time-domain signal 200b, . . . and a fourth time-domain signal 200d, which are generically referred to as time-domain signal 200, and a first frequency-domain signal 202a, a second frequency-domain signal 202b, . . . and a fourth frequency-domain signal 202d, which are generically referred to as frequency-domain signal 202. The second radio apparatus 10b has a similar structure. Different component or components will be further included depending on whether the first radio apparatus 10a or second radio apparatus 10b is a base station apparatus or terminal apparatus. However, for the clarity of explanation, they will be omitted here.

As a receiving operation, the radio unit 20 carries out frequency conversion of received radiofrequency signal received by the antennas 12 so as to derive baseband signals. The radio unit 20 outputs the baseband signals to the processing unit 22 as the time-domain signals 200. The baseband signal, which is composed of in-phase components and quadrature components, shall generally be transmitted by two signal lines. For the clarity of figure, those are presented here by a single signal line. An AGC and an A-D conversion unit are also included. As a transmission operation, the radio unit 20 carries out frequency conversion of baseband signals from the processing unit 22 so as to derive radiofrequency signals. Here, the baseband signal from the processing unit 22 is also indicated as the time-domain signal 200. The radio unit 20 outputs the radiofrequency signals to the antenna 12. A PA (power amplifier) and a D-A conversion unit are also included. It is assumed herein that the time-domain signal 200 is a multicarrier signal converted to the time domain and is a digital signal. Further, signals processed in the radio unit 20 form burst signals, and their formats are those as shown in FIGS. 3(a) and 3(b).

As a receiving operation, the processing unit 22 converts a plurality of time-domain signals 200 respectively into the frequency domain and performs adaptive array signal processing on the converted frequency-domain signals. Then the processing unit 22 outputs the result of adaptive array signal processing as the frequency-domain signals 202. One frequency-domain signal 202 corresponds to a signal transmitted from one of the antennas 14 shown in FIG. 2, and this corresponds to a signal corresponding to one channel. As a transmission operation, the processing unit 22 inputs, from the modem unit 24, the frequency-domain signal 202 serving as a frequency-domain signal, and then performs a distribution processing on the frequency-domain signal. At that time, the processing unit 22 may perform adaptive array signal processing. Then the processing unit 22 coverts the signal that has undergone the distribution processing, into the time domain and outputs it as a time-domain signal 200. It is assumed herein that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 7:
FIG. 7 shows a structure of a frequency-domain signal in FIG. 6.

FIG. 7 illustrates a structure of a frequency-domain signal. Assume herein that a combination of subcarrier numbers "−26" to "26" shown in FIG. 1 is called an "OFDM" symbol. Assume also that an "i"th OFDM symbol is such that subcarrier numbers "1" to "26" and subcarriers "−26" to "−1" are arranged in this order. Assume also that an "i−1"th OFDM symbol is placed before the "i"th OFDM symbol, and an "i+1"th OFDM symbol is placed after the "i"th OFDM symbol.

Referring back to FIG. 6, as a receiving processing, the modem unit 24 demodulates and decodes the frequency-domain signal 202 from the processing unit 22. The demodulation and decoding are carried out per subcarrier. The modem unit 24 outputs the decoded signal to the IF unit 26. As a transmission processing, the modem unit 24 carries out coding and modulation. The modem unit 24 outputs the modulated signal to the processing unit 22 as a frequency-domain signal 202. It is assumed that the modulation scheme and coding rate are specified by the control unit 30 when the transmission processing is carried out. They are specified based on the above-described rate information.

As a receiving processing, the IF unit 26 combines signals outputted from a plurality of modem units 24 and then forms one data stream. The IF unit 26 outputs the data stream. As a transmission processing, the IF unit 26 inputs one data stream and then separates it. Further, the IF unit 26 outputs the thus separated data to a plurality of modem units 24.

A description is given hereinbelow of a case when a request signal is transmitted in such a structure as above. The control unit 30 transmits the rate request signal at a predetermined frequency to the second radio apparatus 10b via the modem unit 24, the processing unit 22 and the radio unit 20. Here, the control unit 30 has a not-shown timer, and the control unit 30 transmits the rate request signal when a predetermined period of time elapses. When the rate request signal has been sent, the timer is reset. Also, the control unit 30 receives the rate information from the not-shown second radio apparatus 10b via the radio unit 20, the processing unit 22 and the modem unit 24. The received rate information is managed by the rate information management unit 32.

When the modem unit 24, the processing unit 22 and the radio unit 20 transmit data, the control unit 30 sets a data rate according to the rate information managed by the rate information management unit 32. That is, the control unit 30 specifies the modulation scheme and the coding rate to the modem unit 24 and specifies the number of streams to the modem unit 24, the processing unit 22 and the radio unit 20.

After data have been transmitted from the first radio apparatus 10a, the control unit 30 acquires the degree of error for the transmitted data. When the radio apparatus 10, namely the second radio apparatus 10b here, receives the data accurately, it is so defined as to transmit an ACK signal to an originating radio apparatus 10, namely the first radio apparatus 10a here. That is, if ACK can be received d after ACK has been sent, the first radio apparatus 10a recognizes that data has been transmitted accurately. On the other hand, if ACK cannot be received after ACK has been sent, the first radio apparatus 10a recognizes that data could not be transmitted. After the data have been transmitted, the control unit 30 starts a timer. If ACK is not received before the timer is time-out, the control unit 30 will determine that the data could not be transmitted.

The control unit 30 derives the ratio of the number of data which could possibly be transmitted to the number of transmitted data. This is equivalent to the ratio for which the data could be transmitted and, in particular, equivalent to the ratio at which the data could be transmitted according to the rate information. That is, if the rate is high, the level of reliability will be said to be high, whereas if the rate is low, the level of reliability will be said to be low. In this manner, the control unit 30 identifies the level of reliability of rate information. Note that a threshold value may be predefined and the level of reliability may be identified as a result of comparison between the threshold value and the ratio. The above processing is equivalent to comparing the number of times when data could not be transmitted, namely the number of errors, with the threshold value. If the level of reliability of rate information is high, the control unit 30 will continue to repeat the same processing. That is, it has the request signal transmitted at predetermined intervals and receives the rate information.

If, on the other hand, the level of reliability of rate information is low, the control unit 30 will lower the frequency of transmitting the rate request signal. That is, the interval at which the rate request signal is transmitted is made longer than a current value. For example, the control unit 30 extends the transmission interval specified to 100 ms, to 200 ms. The frequency of transmission may be reduced in steps according to the number of times when the reliability level of rate information is determined to be low. Further, if the level of reliability of rate information is low, the control unit 30 will set a data rate different from the data rate contained in the rate information, in particular, a low data rate. Also, if a low data rate has already been set, the control unit 30 may change it to a data rate lower than the data rate which has already been set.

When the rate request signal is transmitted, the control unit 30 may use a burst format, as shown in FIG. 3(b), which is defined as a training signal. That is, the control unit 30 generates a burst signal which is to be transmitted from a plurality of antennas 12 and which contains a plurality of streams. Further, in this burst signal, "MIMO-LTS" and the like are contained in streams besides those containing Data.

This structure may be implemented hardwarewise by a CPU, memory and other LSIs of an arbitrary computer, and softwarewise by memory-loaded programs or the like. Depicted herein are functional blocks implemented by cooperation of these. Therefore, it is understood by those skilled in the art that the functional blocks may be implemented by a variety of manners including hardware only, software only or a combination of both.

Figure 8:
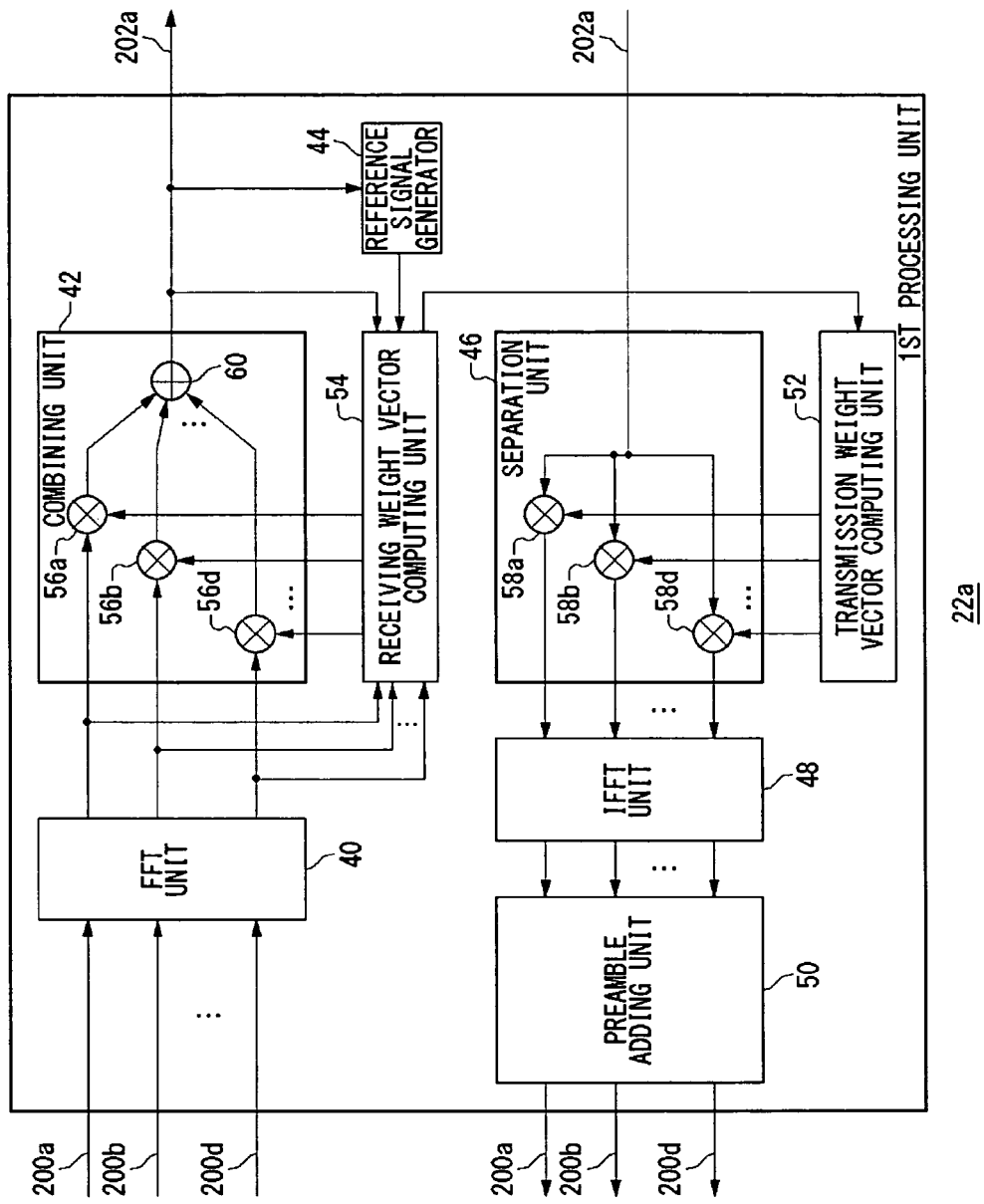
FIG. 8 shows a structure of a first processing unit shown in FIG. 6.

FIG. 8 illustrates a structure of a first processing unit 22a. The first processing unit 22a includes an FFT (Fast Fourier Transform) unit 40, a combining unit 42, a reference signal generator 44, a receiving weight vector computing unit 54, a separation unit 46, a transmission weight vector computing unit 52, an IFFT unit 48 and a preamble adding unit 50. The combining unit 42 includes a first multiplier 56a, a second multiplier 56b, . . . and a fourth multiplier 56d, which are generically referred to as multiplier 56, and an adder 60. The separation unit 46 includes a first multiplier 58a, a second multiplier 58b, and a fourth multiplier 58d, which are generically referred to as multiplier 58.

The FFT unit 40 inputs a plurality of time-domain signals 200 and performs Fourier Transform on them, respectively, so as to derive frequency-domain signals. As described earlier, one frequency-domain signal is such that signals corresponding to subcarriers are arranged serially in the order of the subcarrier numbers.

The multiplier 56 weights the frequency-domain signal with a receiving weight vector outputted from the receiving weight vector computing unit 54, and the adder 60 adds up the outputs from the multipliers 56. Since the frequency-domain signals are here arranged in the order of the subcarrier numbers, the receiving weight vectors outputted from the receiving weight vector computing unit 54 are arranged in such a manner as to correspond thereto, too. That is, one multiplier 56 inputs successively the receiving weight vectors arranged in the order of the subcarrier numbers. Accordingly, the adder 60 adds up a multiplication result on a subcarrier-by-subcarrier basis. As a result, the added-up signals are also arranged serially in the order of the subcarrier numbers, as shown in FIG. 7. The added-up signals are the aforementioned frequency-domain signals 202.

In the following explanation, if the signal to be processed corresponds to the frequency-domain, the processing will be basically executed subcarrier by subcarrier. For the brevity of explanation, the processing for one subcarrier will be described herein. Hence, the processing for a plurality of subcarriers will be accommodated in a manner such that the processing for a single subcarrier is executed in parallel or serially.

During the periods of "Legacy STS", "Legacy LTS", "First MIMO-STS" and "First MIMO-LTS", the reference signal generator 44 outputs, as reference signals, "Legacy STS", "Legacy LTS", "First MIMO-STS" and "First MIMO-LTS" which have been stored beforehand. During periods other than these periods, the frequency-domain signal 202 is determined by a predefined threshold value, and its result is outputted as a reference signal. The determination may be a soft decision instead of the hard decision.

The receiving weight vector computing unit 54 derives receiving weight vectors, based on the frequency-domain signals outputted from the FFT unit 40, the frequency-domain signals 202 and the reference signal. A method for deriving the receiving weight vectors may be arbitrary, and one such a method is the derivation by an LMS (Least Mean Square) algorithm. The receiving weight vectors may be derived by a correlation processing. In such a case, the frequency-domain signal and the reference signal will be inputted not only from the first processing unit 22a but also from the second processing unit 22b and so forth via a not-shown signal line. If a frequency-domain signal in the first processing unit 22a is denoted by x1(t), a frequency-domain signal in the second processing unit 22b by x2(t), a reference signal in the first processing unit 22a by S1(t) and a reference signal in the second processing 22b by S2(t), then x1(t) and x2(t) will be expressed by the following Equation:

$$x_1(t) = h_{11}S_1(t) + h_{21}S_2(t)$$
$$x_2(t) = h_{12}S_1(t) + h_{22}S_2(t) \quad \text{(Eq. 1)}$$

The noise is ignored here. A first correlation matrix R1, with E as an ensemble average, is expressed by the following Equation:

$$R_1 = \begin{bmatrix} E[x_1 S_1^*] & E[x_1 S_2^*] \\ E[x_2 S_1^*] & E[x_2 S_2^*] \end{bmatrix} \quad \text{(Eq. 2)}$$

A second correlation matrix R2 among the reference signals is calculated by the following Equation:

$$R_2 = \begin{bmatrix} E[S_1 S_1^*] & E[S_1 S_2^*] \\ E[S_2 S_1^*] & E[S_2 S_2^*] \end{bmatrix} \quad \text{(Eq. 3)}$$

Finally, the first correlation matrix R1 is multiplied by the inverse matrix of the second correlation matrix R2 so as to derive a receiving response vector:

$$\begin{bmatrix} h_{11} & h_{21} \\ h_{12} & h_{22} \end{bmatrix} = R_1 R_2^{-1} \quad \text{(Eq. 4)}$$

Further, the receiving weight vector computing unit 54 computes a receiving weight vector from the receiving response vector.

The transmission weight vector computing unit 52 estimates the transmission weight vectors necessary for weighting the frequency-domain signals 202, from the receiving weight vectors. The method for estimating the transmission weight vectors is arbitrary but, as a most simple method, the receiving weight vector may be used intact. Or, the receiving weight vector may be corrected using a conventional technique in view of the Doppler frequency shift of a propagation environment caused by time difference in between a receiving processing and a transmission processing. It is assumed here that the receiving weight vectors are used intact as the transmission weight vectors.

The multipliers 58 weight the frequency-domain signals 202 with the transmission weight vectors, and the results thereof are outputted to the IFFT unit 48. Then the IFFT unit 48 performs inverse Fast Fourier Transform on the signals outputted from the multipliers 58 so as to convert them into time-domain signals. As shown in FIGS. 3A and 3B, the preamble adding unit 50 appends preambles in a header portion of burst signal. Here, "Legacy STS", "Legacy LTS", "First MIMO-STS" and "First MIMO-LTS" are appended. The preamble adding unit 50 outputs, as time-domain signals 200, the signals where the preamble has been added. The above-described operation is controlled by the control unit 30 shown in FIG. 6. In FIG. 8, the first time-domain signal 200a and the like appear twice. However, these are the signal in one direction and these correspond to the first time-domain signal 200a and the like which are two-way signals as shown in FIG. 6.

Figure 9:
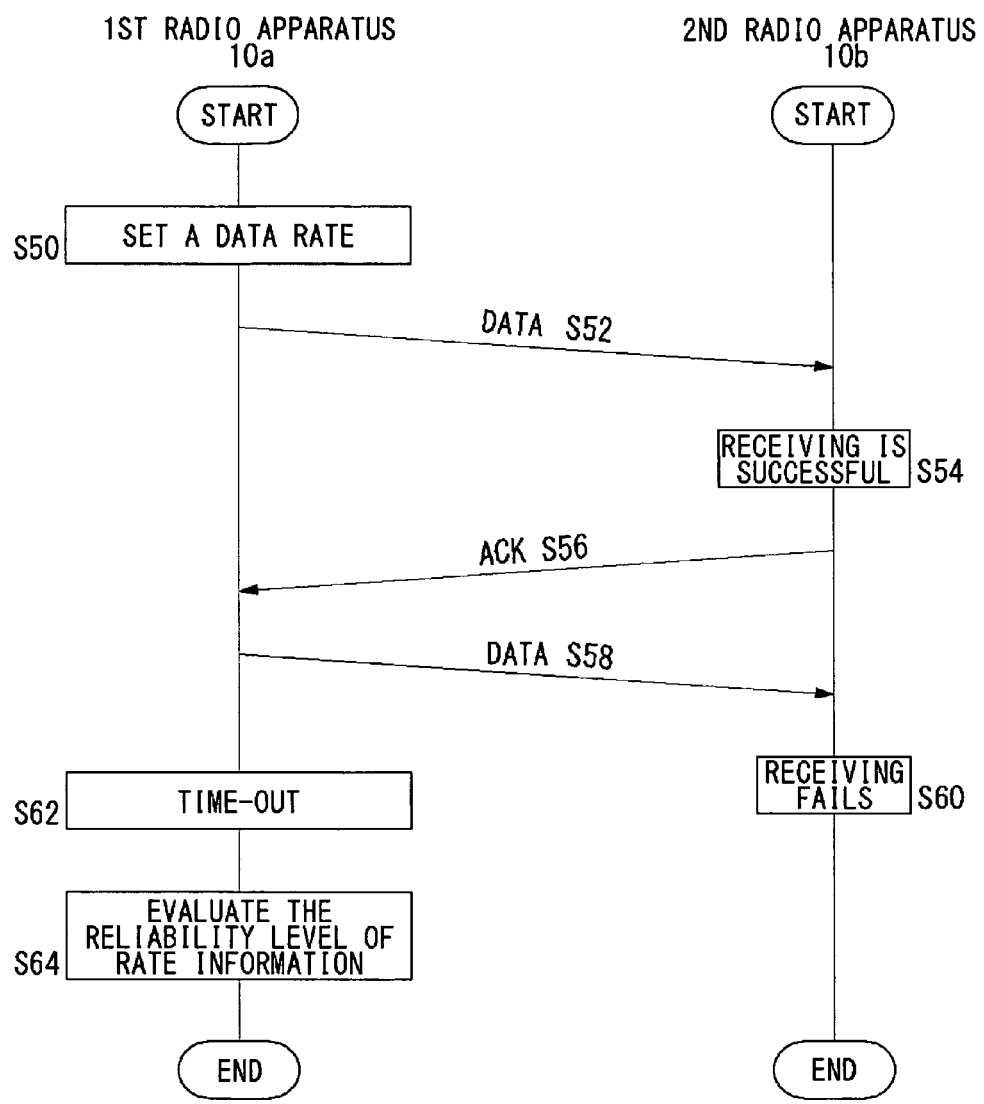
FIG. 9 is a sequence diagram showing a procedure for evaluating the level of reliability in a communication system shown in FIG. 2.

An operation of a communication system 100 structured as above will be described. FIG. 9 is a sequence diagram showing a procedure for evaluating the level of reliability in the communication system 100. The first radio apparatus 10a sets a data rate (S50). It is assumed that the data rate thus set is a value contained in the rate information and the first radio apparatus 10a performs beforehand a processing shown in FIG. 4 and has received the rate information from the second radio apparatus 10b. The first radio apparatus 10a transmits data to the second radio apparatus 10b (S52). The second radio apparatus 10b succeeds in receiving the data (S54) and transmits ACK to the first radio apparatus 10a (S56). Then, the first radio apparatus 10a sends data to the second radio apparatus 10b (S58). When the second radio apparatus 10b fails to receive the data (S60), the first radio apparatus 10a cannot receive ACK and a time-out occurs (S62). In the first radio apparatus 10a, it is determined that data transmission has failed. The first radio apparatus 10a evaluates the level of reliability based on a ratio of the successful data transmission (S64).

Figure 10:
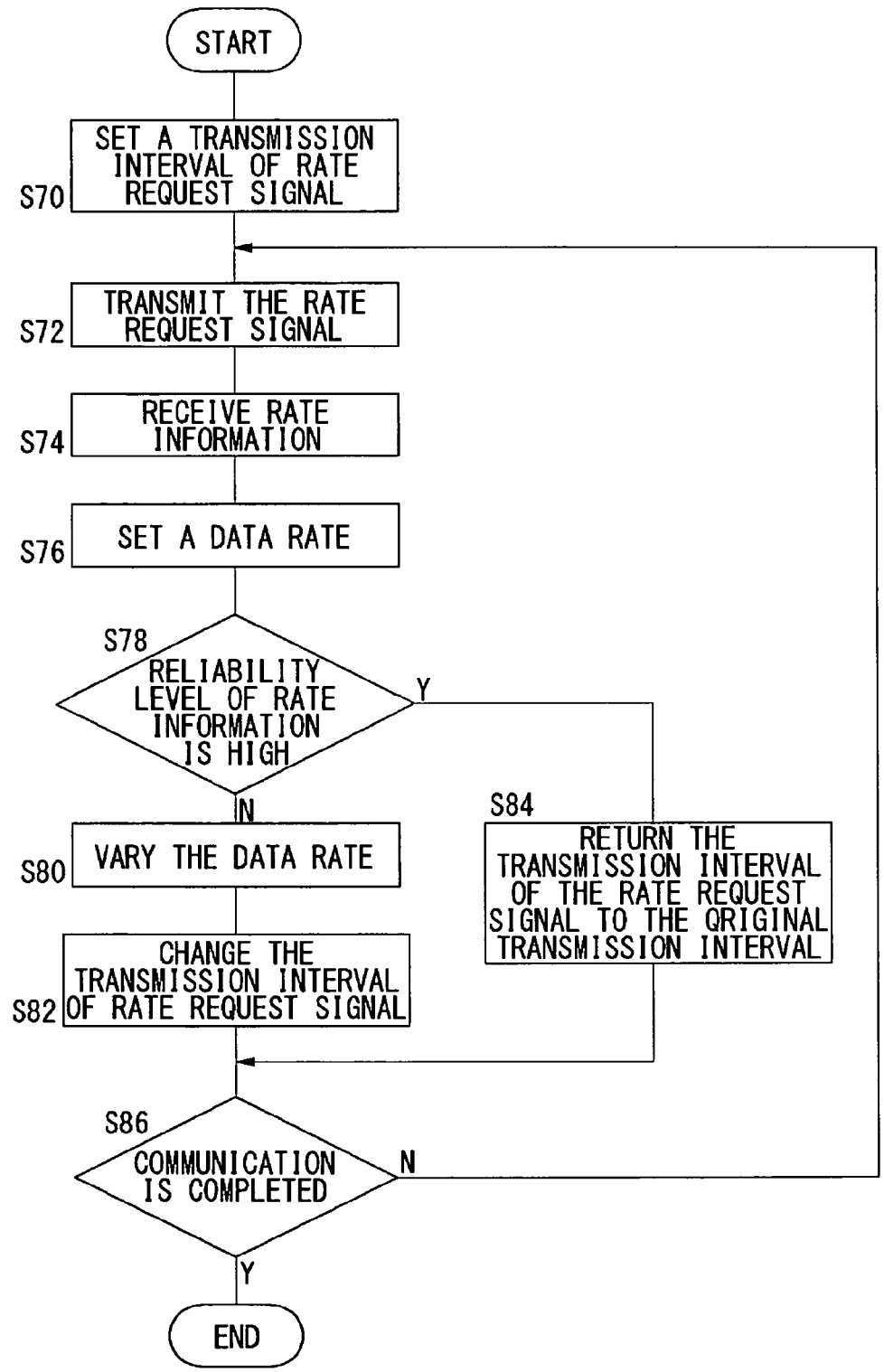
FIG. 10 is a flowchart showing a procedure for setting a data rate in a first radio apparatus shown in FIG. 6.

FIG. 10 is a flowchart showing a procedure for setting a data rate in the first radio apparatus 10a. The control unit 30 sets a transmission interval of the rate request signal (S70). The control unit 30 transmits the rate request signal via the modem unit 24 and the like (S72). After a predetermined period of time has elapsed, the control unit 30 receives the rate information via the modem unit 24 (S74). The control unit 30 sets a data rate to the modem unit 24 and the like (S76). After the control unit 30 has transmitted the data according to the sequence diagram shown in FIG. 9, it evaluates the level of reliability of the rate information. If the level of reliability of the rate information is not high (N of S78), the control unit 30 will vary the data rate (S80) and change the transmission interval of the rate request signal (S82). If, on the other hand, the level of reliability of the rate information is high (Y of S78), the transmission interval of the rate request signal will be returned to the original transmission interval (S84). If the communication is not completed (N of S86), a return will be made to Step 72. If the communication is completed (Y of S86), the processing will be terminated.

According to the exemplary embodiment of the present invention, the low reliability level of the rate information indicates a low need of receiving the rate information from the radio apparatus corresponding thereto. Thus, effective utilization of frequency can be achieved by lowering the transmission frequency of the rate request signal. The rate request signal is sent at a predetermined frequency to a radio apparatus having a high reliability level of the rate information, so that the data rate can be updated as appropriate. The frequency at which the rate information is transmitted is lowered for a radio apparatus having a low reliability level of the rate information, so that data can be transmitted instead. When the reliability level of rate information is low, setting a data accordingly makes data prone to error. However, since a data rate different from this is set, the possibility that data suffers error can be reduced. The reduction in data error can reduce the number of data retransmissions.

Since the level of reliability is identified based on the information on whether data was able to be transmitted or not, the identifying accuracy can be enhanced. Also, the level of reliability can be identified by the final state of data. Since the data rate derived by itself and the data rate received are compared with each other, whether the data rate is too high or too low can be identified in addition to the reliability level of data rate received. A detailed control on the data rates becomes feasible by identifying also whether the data rate is too high or too low. Since MIMO-LTSs are transmitted from a plurality of antennas and the channel characteristics formed by a combination of transmitting side antennas and receiving side antennas are estimated, the data rate can be accurately determined, Second Exemplary Embodiment Similar to the first exemplary embodiment, a second exemplary embodiment of the present invention relates to setting a data rate in a MIMO system. Here, any one of the radio apparatuses 10 is set as a base station apparatus, whereas any another one of the radio apparatuses 10 is set as a terminal apparatus. The base station apparatus periodically transmits a beacon which is annunciation information. A terminal apparatus desiring the connection to said base station apparatus receives the beacon and then transmits to the base station apparatus a request signal with which to start the communication. After the communication has started between the base station apparatus and the terminal apparatus, the data rate is set. Accordingly, in the case of the start of communication, the data rate suitable for channel characteristics is not set. In order to resolve this, the terminal apparatus according to the second exemplary embodiment generates rate information, based on the beacon received. Further, when transmitting to the base station apparatus the request signal with which to start the communication, the terminal apparatus also transmits the rate information. As a result, the data rate suitable for the rate information is set even when the communication has started.

The radio apparatus 10 in the second exemplary embodiment is of the same type as that shown in FIG. 6. It is assumed herein that the first radio apparatus 10a is a base station apparatus and the second radio apparatus 10b is a terminal apparatus. Accordingly, FIG. 6 corresponds to a structure of the second radio apparatus 10b. The control unit 30 receives the beacon from the first radio apparatus 10a via the radio unit 20, the processing unit 22 and the modem unit 24. Based on the received broadcasting signal, the control unit 30 determines a data rate at the time when the data are received. For example, a plurality of threshold values may be provided for the signal strength, and the data rate may be determined in accordance with a result obtained when the strength of a received signals is compared against the thresholds. In such a case, a plurality of threshold values correspond to the data rate values. Also, the data rate may be determined in accordance with the interference amount, delay spread or the like. The control unit 30 generates a request signal with which to start the communication by including the data rate as the rate information, and transmits this via the modem unit 24, the processing unit 22 and the radio unit 20.

Figure 11:
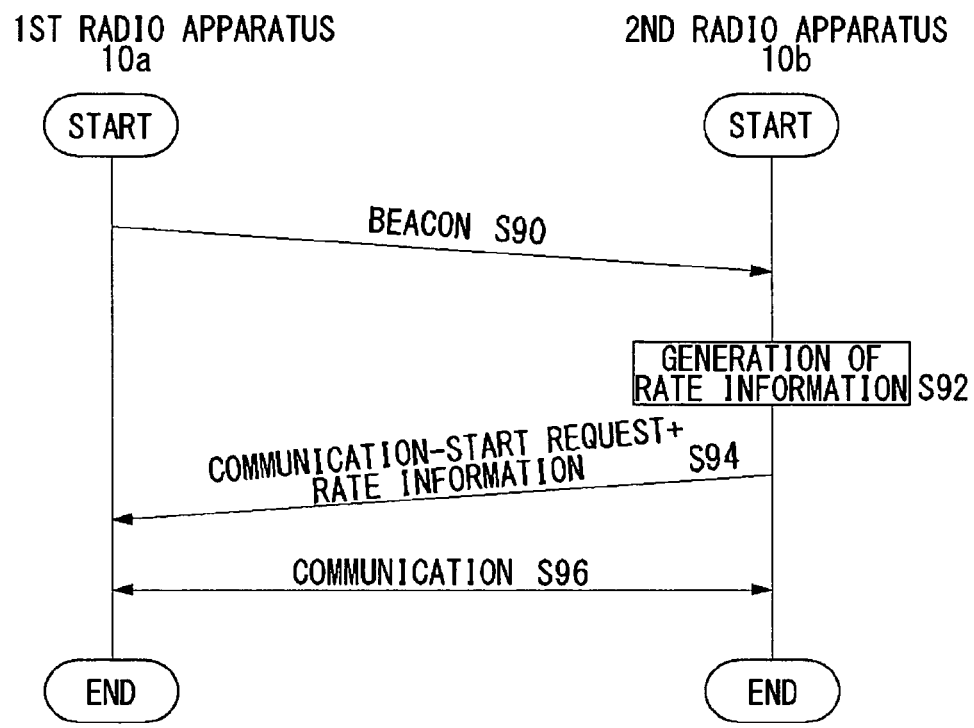
FIG. 11 is a sequence diagram showing a procedure for starting a communication in a communication system according to a second exemplary embodiment of the present invention.

FIG. 11 is a sequence diagram showing a procedure for starting a communication in a communication system 100 according to a second exemplary embodiment of the present invention. The first radio apparatus 10a transmits a beacon (S90). The second radio apparatus 10b generates rate information based on the beacon (S92). The second radio apparatus 10b transmits a communication-start request signal and the rate information to the first radio apparatus 10a in a combined manner (S94). The first radio apparatus 10a and the second radio apparatus 10b starts the communication according to the data rate in response to the rate information (S96).

According to this exemplary embodiment of the present invention, the data rate is determined at a stage of receiving the beacon and the thus determined data rate is used when the communication is to start, so that the data rate suitable for the channel characteristics can be used from the beginning of the communication. Also, using the data rate suitable for the channel characteristics from the beginning of the communication can raise the data rate.

Third Exemplary Embodiment

Similar to the first exemplary embodiment, a third exemplary embodiment of the present invention relates to setting a data rate in a MIMO system. In the first exemplary embodiment, the radio apparatus that has received the beacon transmits the rate information. In the second exemplary embodiment, the radio apparatus that has received the beacon transmits the rate information. Similar to the first exemplary embodiment, in the third exemplary embodiment the radio apparatus that has received the rate request signal also transmits the rate information. However, since the channel characteristics generally vary, the data rate according to the channel characteristics shall vary. Accordingly, there are cases where the data rate which has already been set does not fit to the current channel characteristics. In order to resolve this, the radio apparatus according to the third exemplary embodiment measures the data quality, and if the data quality is not suited for the current channel characteristics, the radio apparatus will transmit the rate information even when it has not received the rate request signal. In so doing, the radio apparatus that has received the rate request signal generates the rate information by using fields such as "MIMO-LTS".

The radio apparatus 10 in the third exemplary embodiment is of the same type as that shown in FIG. 6. In the third exemplary embodiment, attention is directed to the second radio apparatus 10b which is a radio apparatus 10b that transmits the rate information. Thus, FIG. 6 corresponds to the structure of the second radio apparatus 10b. The control unit 30 receives a rate request signal sent from the first radio apparatus 10a, via the radio unit 20, the processing unit 22 and the modem unit 24. According to the rate request signal, the control unit 30 basically transmits the rate information to the first radio apparatus 10a via the modem unit 24, the processing unit 22 and the radio unit 20.

Further, the control unit 30 derives the quality of a radio channel between the first radio apparatus 10a and the second radio apparatus 10b. The quality thereof is derived the same way as the reliability level of the rate information in the first exemplary embodiment is measured in the first exemplary embodiment, for example. That is, the ratio of data which can be normally transmitted is derived. According to the derived quality, the control unit 30 transmits the rate information to the first radio apparatus 10a even if it has not received the rate request signal. Here, the above processing is performed if the derived quality is deteriorated than a threshold value. The data rate contained in the rate information indicates a value different from the current data rate.

Figure 12:
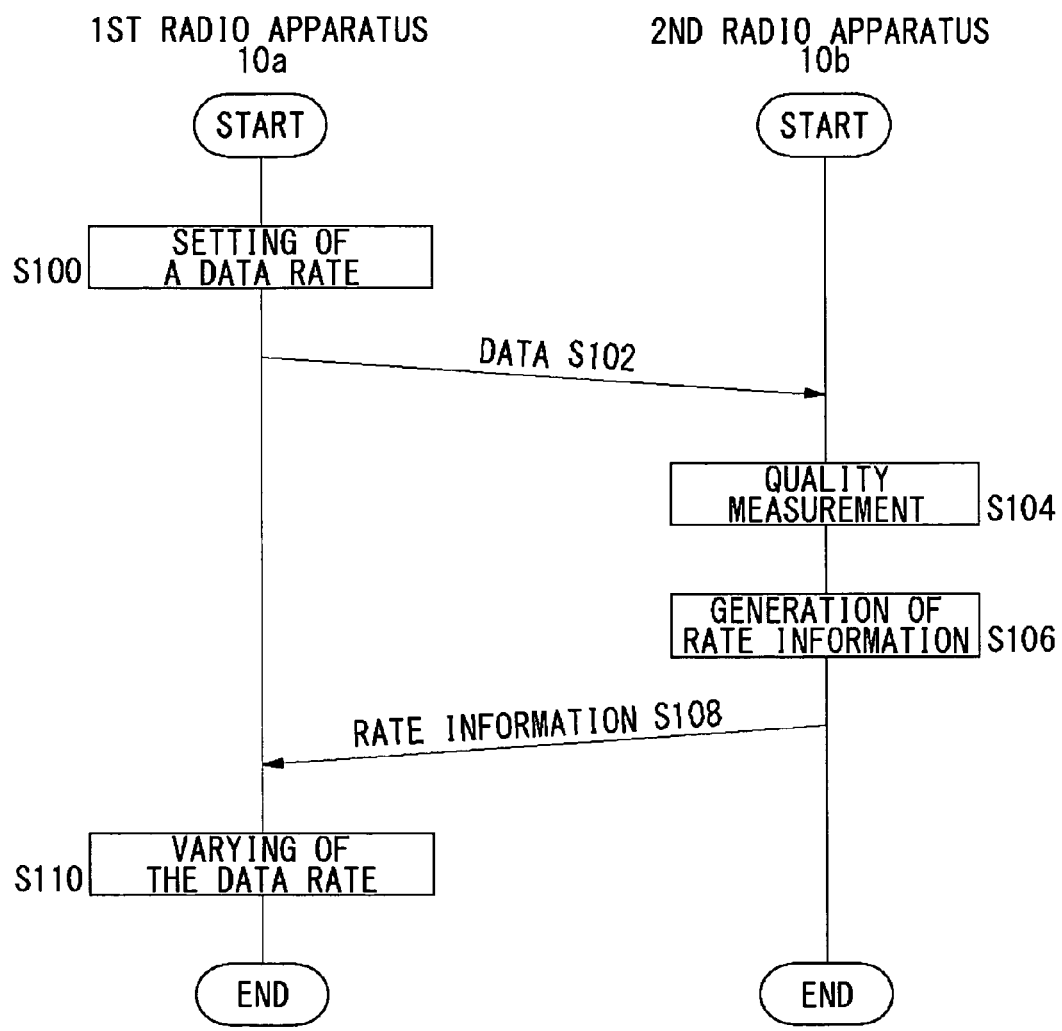
FIG. 12 is a sequence diagram showing a procedure for setting a data rate in a communication system according to a third exemplary embodiment of the present invention.

FIG. 12 is a sequence diagram showing a procedure for setting a data rate in a communication system 100 according to the third exemplary embodiment of the present invention. The first radio apparatus 10a sets a data rate (S100). It is assumed herein that the thus set data rate is a value contained in the rate information and the first radio apparatus 10a performs beforehand the processing shown in FIG. 4 and then receives the rate information from the second radio apparatus 10b. The first radio apparatus 10a transmits data to the second radio apparatus 10b (S102). The second radio apparatus 10b measures the quality, based on the received data (S104). The second radio apparatus 10b generates rate information according to the quality (S106), and transmits the rate information to the first radio apparatus 10a (S108). The first radio apparatus 10a varies the data rate, based on the received rate information (S110).

Figure 13:
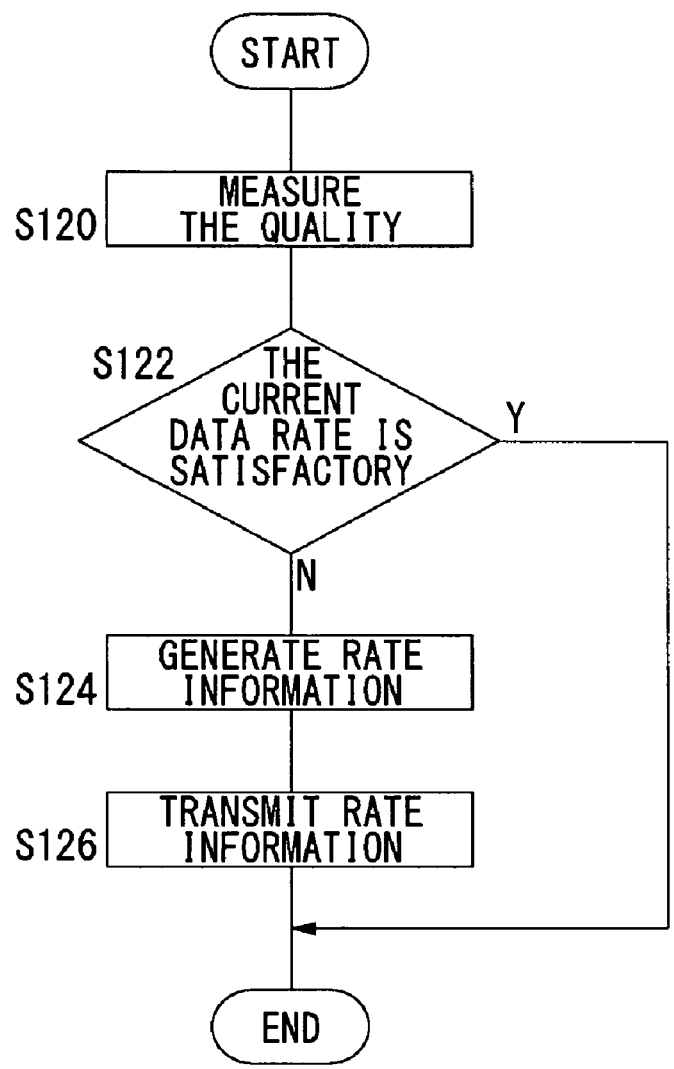
FIG. 13 is a flowchart showing a procedure for transmitting rate information in a second radio apparatus shown in FIG. 2.

FIG. 13 is a flowchart showing a procedure for transmitting rate information in the second radio apparatus 10b shown in FIG. 2. Based on the data received, the control unit 30 measures the quality via the radio unit 20, the processing unit 22 and the modem unit 24 (S120). If the current data rate is not satisfactory (N of S122), the control unit 30 will generate rate information (S124) and transmit the rate information via the modem unit 24, the processing unit 22 and the radio unit 20 (S126). If, on the other hand, the current data is satisfactory (Y of S122), it will continue the data receiving processing.

Figure 14:
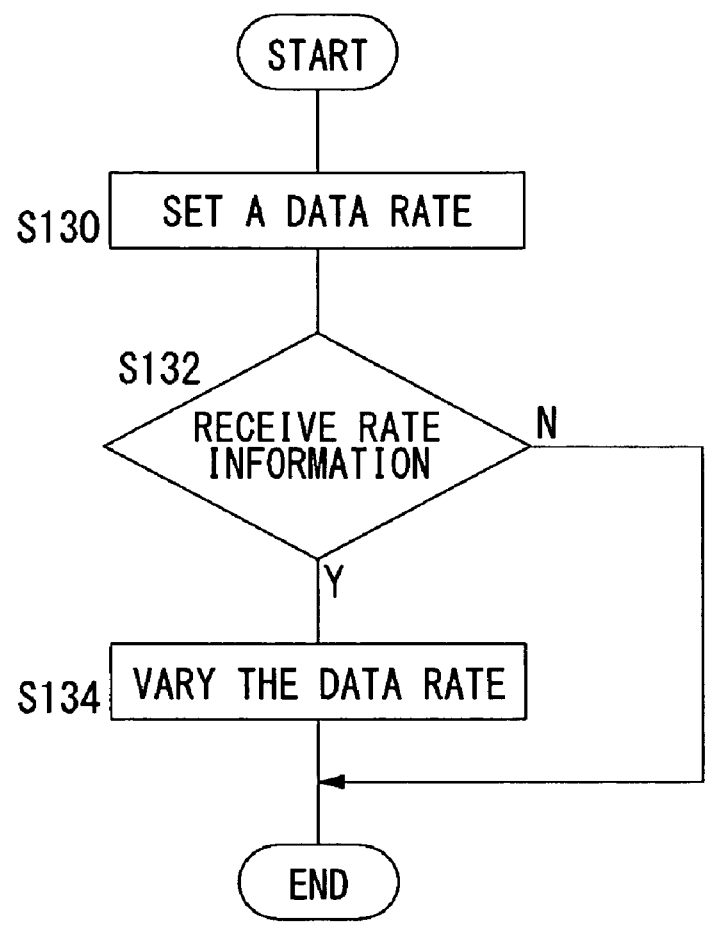
FIG. 14 is a flowchart showing a procedure for setting a data rate in a first radio apparatus shown in FIG. 6.

FIG. 14 is a flowchart showing a procedure for setting a data rate in the first radio apparatus 10a. The control unit 30 sets a data rate for the modem unit 24 and the like (S130). If the control unit 30 receives the rate information via the radio unit 20, the processing unit 22 and the modem unit 24 (Y of S132), the control unit 30 will vary the data rate (S134). If, on the other hand, the control unit 30 does not receive the rate information (N of S132), the processing will end.

According to the exemplary embodiment of the present invention, the rate information is transmitted even when the rate request signal has not been received, so that the data rate can be actively varied. If the current data rate is not suitable for the channel characteristics, this can be changed. Since the data rate can be actively varied from a targeted radio apparatus according to a receiving status of the targeted radio apparatus, the data rate can be made faster and the error rate can be reduced. Since MIMO-LTSs from a plurality of antennas are received and the channel characteristics produced by a combination of transmitting side antennas and receiving side antennas are estimated, the data rate can be accurately determined.

Fourth Exemplary Embodiment

A fourth exemplary embodiment of the present invention is equivalent to a transmitting function in a MIMO system where the first to third exemplary embodiments explained so far can be combined together. Hereinafter, part of a transmitting function in a radio apparatus will be referred to as "transmitting apparatus". The transmitting apparatus transmits a training signal. Here, a description will be given centering around a burst format that contains the training signal. The timing at which the training signal is transmitted is the timing when the rate request signal, beacon and data in the first to third exemplary embodiments are transmitted, so that the description thereof is omitted here. The transmitting apparatus transmits a burst signal of multiple streams corresponding to the number of antennas, and allocates a plurality of MIMO-STSs to a burst signal of multiple streams. Following the plurality of MIMO-STSs, the transmitting apparatus allocates a plurality of MIMO-LTSs to a burst signal of multiple streams. Further, the transmitting apparatus allocates data to a part of a burst signal of multiple streams. The data are extended to those of multiple streams by multiplying the data by a steering matrix. The transmitting apparatus also multiplies MIMO-LTS by the steering matrix. In what is to follow, a burst signal of multiple streams to which the steering matrix has been multiplied is also called "burst signal of multiple streams" or "bust signal of a plurality of streams" not to be distinguished from that described above.

Here, MIMO-STS has a predetermined cycle. More specifically, a guard interval is attached to a signal whose cycle is 1.6 μs. Note that the above-mentioned steering matrix contains a component by which to execute a cyclic time shift per stream. The cyclic time shift is the so-called CDD (Cyclic Delay Diversity) where a cyclic time shift is applied to the cycle of patterns contained in MIMO-LTS. The similar processing is performed on Data as well. The amount of time shift differs per burst signal of multiple streams. The transmitting apparatus deforms a burst signal of a plurality of streams and transmits the burst signal of a plurality of deformed streams from a plurality of antennas, respectively.

Problems associated with the exemplary embodiments described as above may be expressed as follows. That is, want to transmit training signals by such a burst format as to enhance the accuracy of channel estimation in a targeted radio apparatus. Also, want to transmit training signals by such a burst format as to enhance the accuracy of rate information. Also, want to transmit data by such a burst format as to prevent the deterioration of communication quality of data even in a case when these training signals are transmitted. Also, want to effectively utilize the training signals to have the data received.

Figure 15:
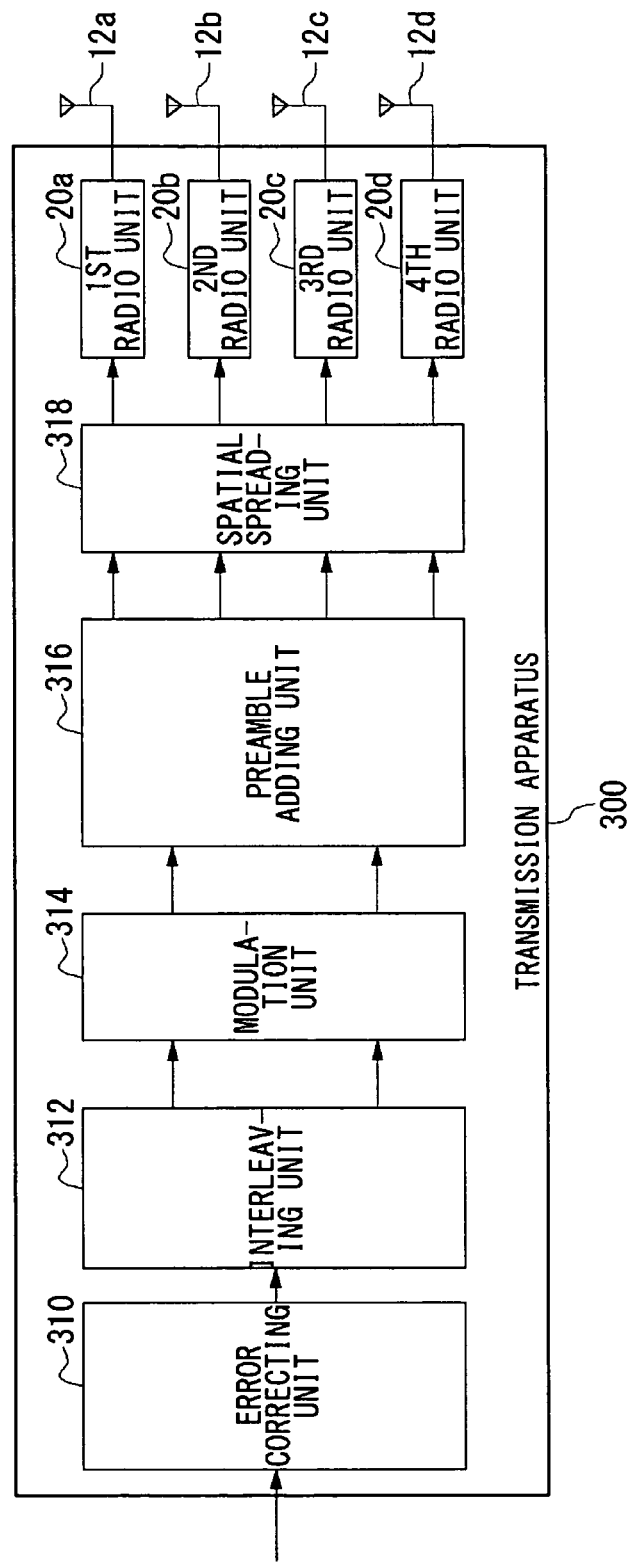
FIG. 15 shows a structure of a transmitting apparatus according to a fourth exemplary embodiment of the present invention.

FIG. 15 shows a structure of a transmitting apparatus 300 according to the fourth exemplary embodiment of the present invention. The transmitting apparatus 300 includes an error correcting unit 310, an interleaving unit 312, a modulation unit 314, a preamble adding unit 316, a spatial spreading unit 318, a first radio unit 20a, a second radio unit 20b, a third radio unit 20c and a fourth radio unit 20d, which are generically referred to as radio unit 20, and a first antenna 12a, a second antenna 12b, a third antenna 12c and a fourth antenna 12d, which are generically referred to as antenna 12.

The error correcting unit 310 carries out coding for error correction. Here, the convolutional coding is to be carried out, and the coding rate thereof is selected from among predefined values. The interleaving unit 312 interleaves data on which the convolutional coding has been performed. Further, the interleaving unit 312 separates data into a plurality of streams before outputting the data. Here, the data are separated into two streams. The data of two streams are mutually independent from each other.

The modulation unit 314 modulates Data of two streams, respectively. The preamble adding unit 316 appends a preamble to the modulated data. For that purpose, the preamble adding unit 316 stores MIMO-STSS, MIMO-LTSs and so forth as preambles. The preamble adding unit 316 generates a burst signal of multiple streams wherein the burst signal contains MIMO-STSs and MIMO-LTSs assigned respectively to a plurality of streams and Data assigned to at least one of the plurality of streams. As described earlier, Data are formed by two streams. It is assumed herein that the number of a plurality of streams is "4". Thus, MIMO-STSs and MIMO-LTSs are assigned respectively to a burst signal of four streams, and Data are assigned to two of four streams constituting the burst signal. As a result, a burst signal of four streams is outputted from the preamble adding unit 316.

Though the detailed description of MIMO-STS is omitted here, STS corresponding to at least one of a plurality of streams in a burst signal of multiple streams may, for example, be so defined as to use subcarriers at least part of which differs from those corresponding to a burst signal of other streams. STSs may be defined in a manner such that the number of subcarriers to be used for each STS is the same and mutually different subcarriers are used. As described earlier, each burst signal of multiple streams uses a plurality of subcarriers, and MIMO-LTSs assigned to the burst signal of multiple streams use different subcarriers for their respective streams. That is, tone interleaving is carried out. Note that each of burst signals of multiple streams may be called "burst signal" and the burst signals of multiple streams may be collectively called the "burst signal". The both will be used here without being distinguished from each other.

Among a burst signal of multiple streams, the spatial spreading unit 318 multiplies MIMO-LTS and Data by steering matrices, respectively, so as to generate the MIMO-LTSs multiplied by the steering matrix and the data whose count has been increased to the number of a plurality of streams. Before the multiplication, the spatial spreading unit 318 extends the degree of inputted Data up to the number of a plurality of streams. The number of inputted Data is "2" and is represented here by "Nin". Hence, the inputted data is expressed by a vector "Nin×1". The number of multiple streams is "4" and is represented here by "Nout". The spatial spreading unit 318 extends the degree of inputted data from Nin to Nout. That is, the vector "Nin×1" is extended to a vector "Nout×1". In so doing, "0's" are inserted to components from (Nin+1)th row to Nout-th row. The steering matrix is expressed as follows.

$$S(l) = C(l)W \quad \text{(Eq. 5)}$$

The steering matrix is a matrix of "Nout×Nout". W is an orthogonal matrix of "Nout×Nout". One example of the orthogonal matrices is a Walsh matrix. Here, "M" indicates the subcarrier number, and the multiplication by the steering matrix is carried out on a subcarrier-by-subcarrier basis. C is expressed as follows and is used for CDD.

$$C(l) = \text{dia}(1, \exp(-j2\pi l \delta / N\text{out}), \ldots, \exp(-j2\pi l \delta (N\text{out}-1)/N\text{out})) \quad \text{(Eq. 6)}$$

Here, δ indicates a shift amount. That is, the spatial spreading unit 318 carries out, stream by stream, the cyclic time shifting in the MIMO-LTS multiplied by an orthogonal matrix, by a shift amount corresponding to each of a plurality of streams, and at the same time carries out, stream by stream, the cyclic time shifting in the data whose count has been increased to the number of a plurality of streams. The shift amount is set to a different value for each stream. In so doing, at least one of the shift amounts corresponding respectively to a plurality of streams is so set as to be greater than or equal to a predetermined cycle that MIMO-STS had. Since the cycle that MIMO-STS had is 1.6 μs, at least one of the shift amounts is set to 1.6 μs, for instance. In such a case, applying the time shifting to MIMO-STS is equivalent to that no shifting occurs. For that reason, the time shifting is not applied to MIMO-STS here. As a result of the above processing, the spatial spreading unit 318 deforms the burst signals of multiple streams.

There are provided the radio units 20 the number of which is equal to the number of antennas 12. The radio unit 20 transmits the deformed burst signals of multiple streams. At the time, the radio unit 20 transmits the burst signal of multiple streams by associating them with a plurality of antennas 12. The radio unit 20 includes an IFFT unit, a GI unit, a quadrature modulation unit, a frequency conversion unit and an amplification unit, which are all not shown here. The IFFT unit performs IFFT, thereby converting a frequency-domain signal using a plurality of subcarriers into a time-domain signal. The GI unit appends a guard interval to time-domain data. The quadrature modulation unit carries out quadrature modulation. The frequency conversion unit performs a frequency conversion by transforming a quadrature-modulated signal into a radiofrequency signal. The amplification unit is a power amplifier for amplifying the radiofrequency signals. It is to be noted that the spatial spreading unit 318 may be provided in a position subsequent to the not-shown IFFT unit.

FIGS. 16(a) and 16(b) each illustrates a burst format generated by the transmitting apparatus 300. FIG. 16(a) shows a burst format in a burst signal of multiple streams outputted from the preamble adding unit 316. FIG. 16(a) is equivalent to FIG. 3(b) and therefore the explanation thereof is omitted. Here, "4" MIMO-STSs and "4" MIMO-LTSs are added respectively to "4" streams" in a burst signal of multiple streams. On the other hand, Data of "2" streams, which are at least one of multiple streams, are appended as "First Data" and "Second Data". FIG. 16(b) shows a burst signal of multiple streams deformed by the spatial spreading unit 318. The MIMO-STSs are the same as those of FIG. 16(a). As a result of multiplication by the steering matrix, MIMO-LTS of FIG. 16(a) becomes "MIMO-LTS'". This is illustrated as "First MIMO-LTS'" through "Fourth MIMO-LTS'". As a result of multiplication by the steering matrix, "First Data" and "Second Data" of FIG. 16(a) become Data of four streams. This is illustrated as "First Data'" through "Fourth Data'" in FIG. 16(b).

FIG. 17 shows another burst format of a burst signal generated by the transmitting apparatus 300. FIG. 17 corresponds to a burst format for a burst signal of multiple streams outputted from the spatial spreading unit 318 and also corresponds to a burst format in which a burst format is multiplied by a steering matrix of FIG. 3(c). "First MIMO-STS'" through "Third MIMO-STS'" of FIG. 17 correspond to a result obtained when "First MIMO-STS" and "Second MIMO-STS" of FIG. 3(c) are multiplied by the steering matrix. Then the steering matrix corresponds to a "3×3" matrix. Thus, adding "0s" to the "First MIMO-STS" and "Second MIMO-STS" extends each to "3×1" vector. "First MIMO-LTS'" through "Third MIMO-LTS'" of FIG. 17 correspond to a result obtained when "First MIMO-LTS" and "Second MIMO-LTS" of FIG. 3(c) are multiplied by the steering matrix. "Fourth MIMO-LTS'" through "Sixth MIMO-LTS'" correspond to a result obtained when "First MIMO-LTS" and "Second MIMO-LTS" of FIG. 3(c) are multiplied by the steering matrix.

According to the exemplary embodiment of the present invention, even if the number of Data streams is less than the number of MIMO-LTS streams, the multiplication by orthogonal matrices and the cyclic time shift processing are carried out. Hence, the number of streams containing Data can be made equal to the number of streams containing MIMO-LTSs. MIMO-LTS also undergoes the same processing as with Data streams. Thus, the radio apparatus to be communicated can use MIMO-LTS in the case of receiving the Data. The same processing as with the Data streams is not performed on MIMO-STSs, so that the amount of time shift in CDD can be made larger and the receiving characteristics in a targeted radio apparatus can be enhanced. Since MIMO-LTS is transmitted from all of antennas, the receiving side can estimate possible channels for all of the antennas. Even if the number of data streams is not equal to the number of antennas, signals can be evenly transmitted from all of the antennas by performing the processing using the Walsh matrix and CDD on data. The data power can be adjusted to MIMO-LTS.

Since the processing using the Walsh matrix and CDD is also performed on MIMO-LTSs, the channel estimated by MIMO-LTSs in the receiving side can be used directly for the receiving of Data. If CDD is applied to MIMO-LTSs and Data by a sufficiently large shift amount, the difference of power in MIMO-LTS and Data will be very small, thereby enhancing the accuracy of setting the AGC in the receiving side. The time shifting by a large shift amount cannot be performed on MIMO-STS. In such a case, associating all MIMO-STSs with all antennas can make the power equal between the MIMO-STS and MIMO-LTS. Also, the power of MIMO-STS can be made equal to the power of MIMO-LTS without a trouble of applying the CDD processing. Also, since MIMO-LTSs have been tone-interleaved, the transmission power can be maintained even if MIMO-LTSs are transmitted from all of the antennas by performing the processing using the Walsh matrix and CDD. Where the processing using the Walsh matrix and CDD is not performed, each power within a burst signal is "Three STSs"="Three LTSs">"Two Data" if Data of two streams are transmitted by three antennas. Where the processing using the Walsh matrix and CDD is performed, "Three STSs"="Three LTSs"="Three Data" can be achieved.

First Modification of the First Exemplary Embodiment

Modifications to the exemplary embodiments will be described below. A first modification of the first exemplary embodiment differs from the first exemplary embodiment in the method for identifying the reliability level of the rate information. In this case, the processing unit 22 in the second radio apparatus 10b also derives channel characteristics between the first radio apparatus 10a and the second radio apparatus 10b. The channel characteristics correspond to the channel characteristics between the aforementioned ith antenna 12i and the aforementioned jth antenna 14j. Accordingly, the channel characteristics have components the number of which corresponds to the number of antennas 12 and the number of antennas 14, and thus have sixteen components in the case of FIG. 2. Here, when MIMO-LTSs as shown in FIGS. 3(a) to 3(c) and the like are received, the channel characteristics are derived by correlation processing performed between the received MIMO-LTSs and the MIMO-LTSs stored beforehand. The channel characteristics may be derived by using a known method other than the correlation processing. When the second radio apparatus 10b receives a rate request signal from the first radio apparatus 10a, the second radio apparatus 10b transmits the channel characteristics together with the rate information as a response signal.

The processing unit 22 in the first radio apparatus 10a derives a data rate, based on the channel characteristics received from the second radio apparatus 10b through the radio unit 20 and the like. The data rate may be derived by using an arbitrary method. For example, the data rate is derived in a manner that a threshold value of the signal strength is stored beforehand per data rate and the processing unit 22 compares the signal strength for the received channel characteristic against the threshold value. The control unit 30 derives a difference between the rate information contained in the response signal received by the processing unit 22 and the like and the data rate derived by the processing unit 22.

In the above case, if the difference in data rate is greater than a predetermined threshold value, the control unit 30 will identify that the reliability level of the rate information contained in the response signal received by the processing unit 22 is low. That is, the control unit 30 identifies the level of reliability of the rate information contained in the response signal received by the processing unit 22, based on the difference. The processing subsequent to this is the same as that of the first exemplary embodiment and therefore the explanation thereof is omitted here. It is to be noted that the second radio apparatus 10b may transmit an RSSI value instead of the channel characteristic and the processing unit 22 in the first radio apparatus 10a may generate the rate information based on the received RSSI value.

Figure 18:
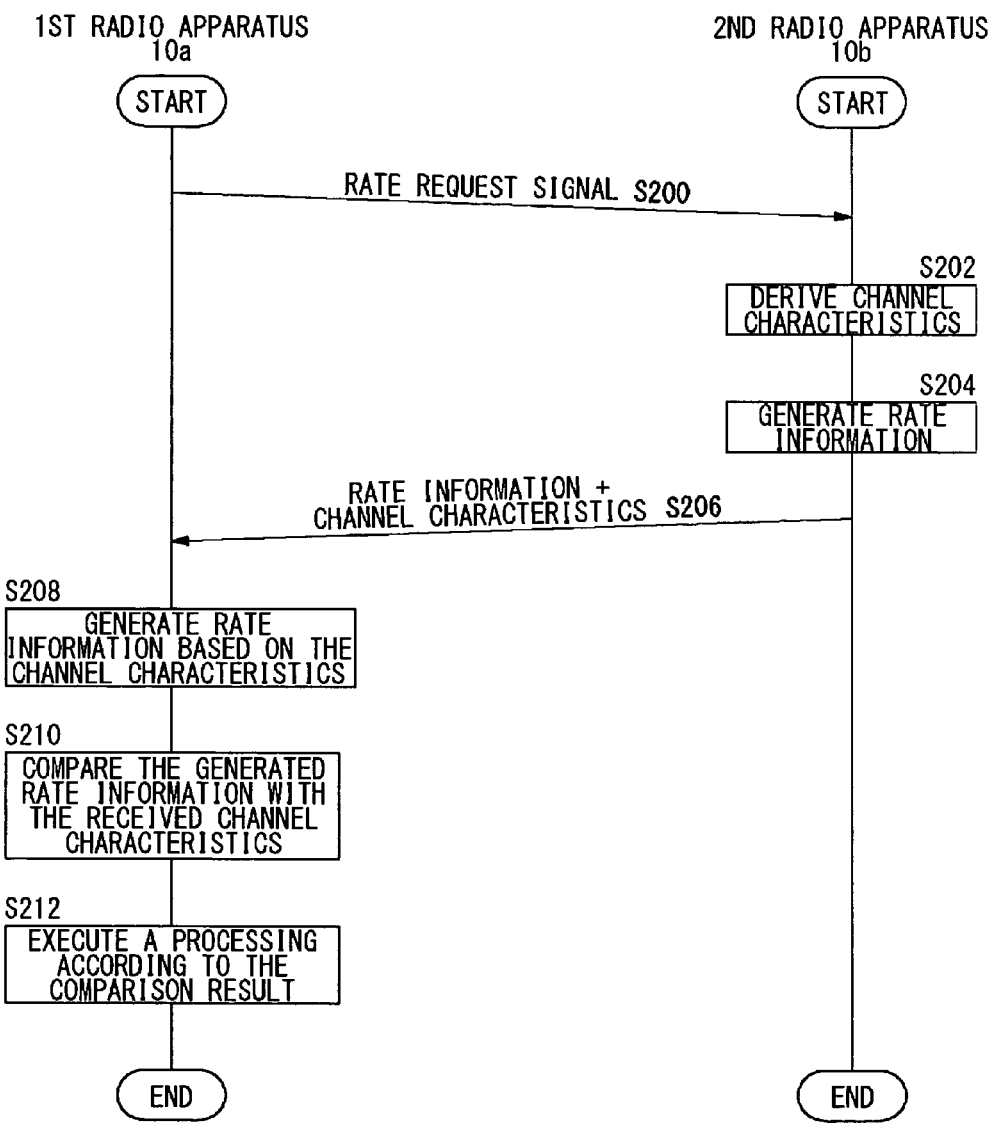
FIG. 18 is a sequence diagram showing a procedure for identifying the level of reliability according to a first modification of a first exemplary embodiment of the present invention.

FIG. 18 is a sequence diagram showing a procedure for identifying the level of reliability according to the first modification of the first exemplary embodiment of the present invention. The first radio apparatus 10a transmits a rate request signal to the first radio apparatus 10a (S200). Instead of the rate request signal, the packet signal as shown in FIGS. 3(a) to 3(c) may be transmitted. The second radio apparatus 10b derives channel characteristics (S202) and, at the same time, generates rate information (S204). The second radio apparatus 10b transmits the rate information and the channel characteristics to the first radio apparatus 10a (S206). The first radio apparatus generates rate information, based on the received channel characteristics (S208). The first radio apparatus 10a compares the generated rate information with the received rate information (S210) and performs a processing according to the comparison result (S212). The processing according to the comparison result will be described later.

Figure 19:
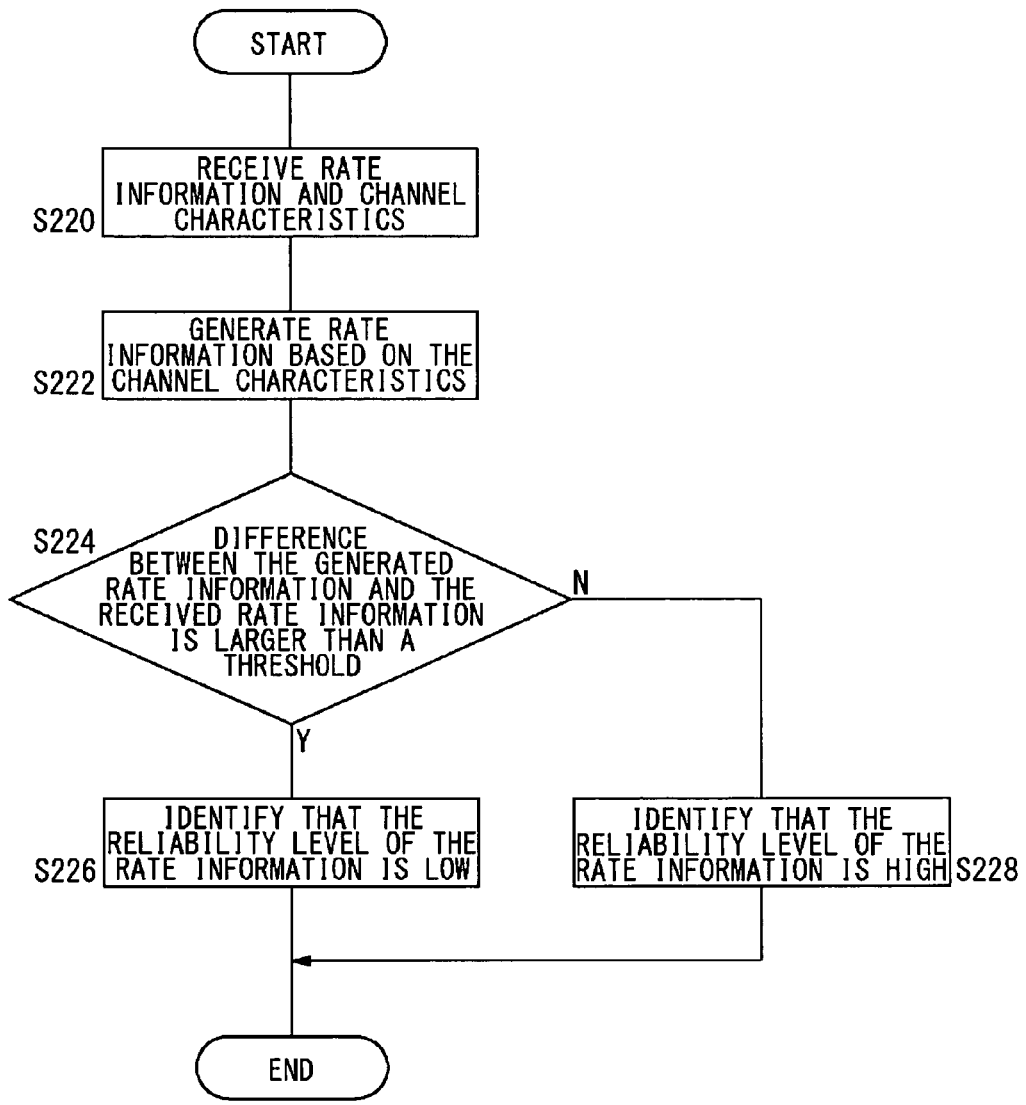
FIG. 19 is a flowchart showing a procedure for evaluating the level of reliability in a first radio apparatus shown in FIG. 18.

FIG. 19 is a flowchart showing a procedure for evaluating the level of reliability in the first radio apparatus shown in FIG. 18. FIG. 19 corresponds to the processing from Step 208 and onward in FIG. 18. The processing unit 22 receives the rate information and the channel characteristics (S220). The processing unit 22 generates rate information, based on the channel characteristics (S222). If the difference between the generated rate information and the received rate information is greater than a threshold value (Y of S224), the control unit 30 will identify that the reliability level of the received rate information is low (S226). If, on the other hand, the difference between the generated rate information and the received rate information is not greater than the threshold value (N of S224), the control unit 30 will identify that the reliability level of the received rate information is high (S228).

According to the exemplary embodiment of the present invention, the rate information is produced by the apparatus itself from the channel characteristics and the thus generated rate information is used to identify the level of reliability. Hence, the identifying accuracy can be enhanced. Since the rate information is generated from the channel characteristics, reference values having high accuracy can be used.

Second Modification of the First Exemplary Embodiment

A second modification of the first exemplary embodiment relates to a method for determining an interval at which the rate request signal is transmitted. As described above, the control unit 30 transmits the rate request signal to the second radio apparatus 10b at a predetermined frequency via the processing unit 22 and the like. The control unit 30 receives rate information on the rate request signal from the second radio apparatus 10b via the processing unit 22 and the like. The control unit 30 has the rate information management unit 32 manage the received rate information and sets the data rate used when the data are transmitted, based on the received rate information. Here, the rate information management unit 32 manages the history of the rate information received from the second radio apparatus 10b.

While referring to the history managed by the rate information management unit 32, the control unit 30 identifies the degree of variation in the data rate indicated by the rate information. The degree of variation is derived by measuring the number of times that the data rate is switched. The degree of variation may be derived by calculating variance values of data rates. If the degree of variation is less than a predetermined threshold value, the control unit 30 will lower the frequency at which the rate request signal is transmitted. That is, if it is estimated that the variation in channel characteristics between the first radio apparatus 10a and the second radio apparatus 10b is small, the interval defined by the frequency at which the data rate is to be updated may be set longer to a certain degree, so that the transmission rate of the rate request signal can be reduced.

Figure 20:
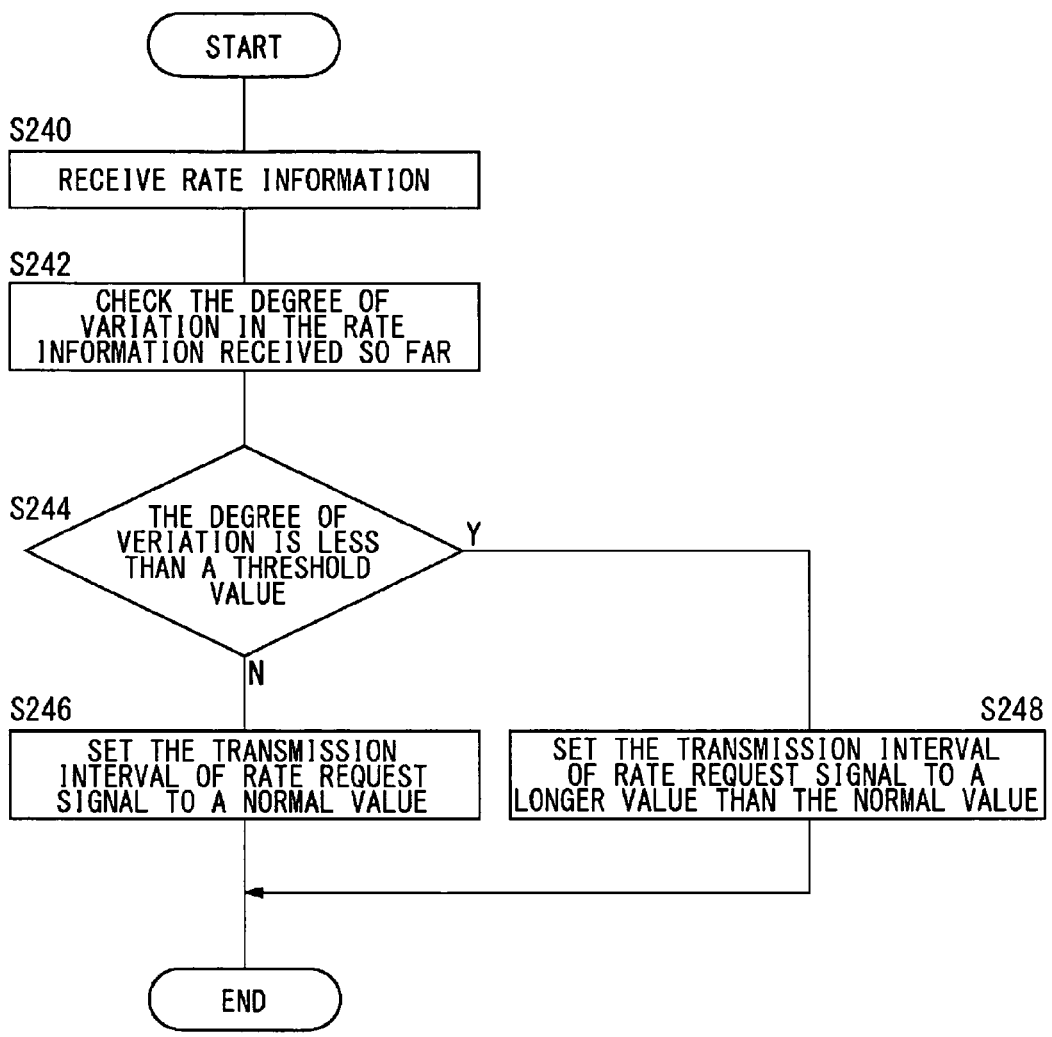
FIG. 20 is a flowchart showing a procedure for setting a transmission interval according to a second modification of a first exemplary embodiment of the present invention.

FIG. 20 is a flowchart showing a procedure for setting the transmission interval according to the second modification of the first exemplary embodiment of the present invention. The control unit 30 receives rate information via the processing unit 22 and the like (S240). While accessing the rate information management unit 32, the control unit 30 checks the degree of variation in the rate information received so far (S242). If the degree of variation is not less than a threshold value (N of S244), the control unit 30 will set the transmission interval of the rate request signal to a normal value (S246). Here, the normal value may be a predetermined fixed value. If, on the other hand, the degree of variation is less than the threshold value (Y of S244), the control unit 30 will set the transmission interval of the rate request signal to a longer value than the normal value (S248). As described above, the transmission interval of the rate request signal also varies with the degree of variation. That is, as the need of exchange between the rate request signal and the rate information becomes smaller, the frequency at which the rate information is transmitted becomes smaller; and as the variation in the rate information becomes larger, the frequency of transmitting the rate request signal becomes larger.

If the degree of variation is greater than or equal to the predetermined threshold value, the control unit 30 may raise the frequency of transmitting the rate request signal. That is, if it is estimated that the variation in channel characteristics between the first radio apparatus 10a and the second radio apparatus 10b is large, the interval defined by the frequency at which the data rate is to be updated needs to be shorter to a certain degree. In such a case, the control unit 30 increases the frequency of transmitting the rate request signal. Thereby, the most recent rate information is so acquired as to follow the variation in channel characteristics. As a result, a data rate suited for the latest channel characteristic is set.

According to the exemplary embodiment of the present invention, if the variation in rate information is small, a fixed data rate will be used for a certain period of time. Hence, the worsening of the characteristics can be suppressed even though the rate information is not requested. Also, the frequency at which the rate request signal is transmitted becomes less, so that the transmission efficiency can be enhanced. As the variation in the rate information becomes larger, the variation in the channel characteristics also becomes larger. Thus, increasing the frequency of transmitting the rate request signal can result in the acquisition of the latest rate information. Also, since the latest rate information can be acquired, the receiving characteristics can be improved.

Third Modification of the First Exemplary Embodiment

A third modification of the first exemplary embodiment relates to having another information contained in the case of transmitting the rate request signal. In the above exemplary embodiments so far, the first radio apparatus 10a transmits the rate request signal. When the rate request signal is transmitted, the first radio apparatus 10a according to the third modification includes information, on a desired data rate when the data are transmitted, into the rate request signal. That is, when transmitting the data followed by the transmission of the rate request signal, the first radio apparatus 10a notifies the second radio apparatus 10b of which data rate is to be used when the data are transmitted. For example, the value of a desired data rate may be notified. Aside from this, the degree of priority for data may be predefined and the first radio apparatus 10a may convey the degree of priority to the second radio apparatus 10b.

Figure 21:
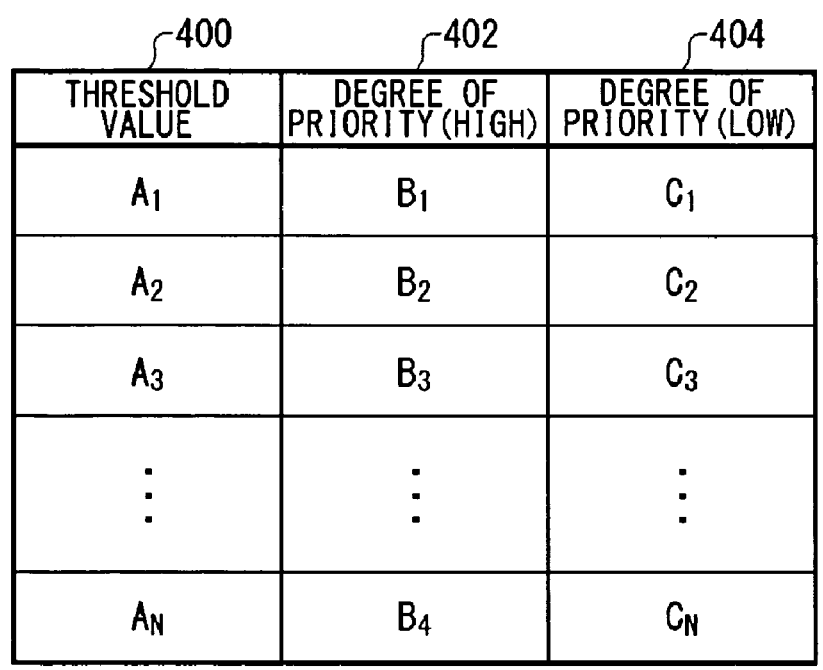
FIG. 21 shows a relation between threshold values stored in a rate information management unit of FIG. 6 and data rates, in a third modification of a first exemplary embodiment of the present invention.

The control unit 30 in the second radio apparatus 10b, which has received the degrees of priority, generates the rate information as follows. A data rate for a threshold value of the received signal strength is stored in the rate information management unit 32 for each priority degree. FIG. 21 shows a relation between threshold values stored in the rate information management unit 32 and data rates, in the third modification of the first exemplary embodiment of the present invention. As shown in the Figure, a threshold value column 400, a data rate column 402 with the degree of priority being high and a data rate column 404 with the degree of priority being low are defined. In the threshold value column 400, a plurality of threshold values of the received signal strength are defined. For example, "$A_1$" corresponds to a value where the received signal strength is high, whereas "$A_N$" corresponds to a value where the received signal strength is low. The data rate column 402 with the degree of priority being high corresponds to a data rate where the degree of priority for the threshold value is high.

That is, the control unit 30 in the second radio apparatus 10b acquires the received signal strength, and compares the acquired received signal strength against a threshold value so as to identify any one of the data rates "$B_1$" to "$B_N$". It is assumed herein that the highest data rate is identified among data rates satisfying the threshold value. The data rate column 404 with the degree of priority being low contains data rates corresponding to a case when the degree of priority for a threshold value is low. Similar to the case when the degree of priority is high, the control unit 30 identifies the data rates in a case when the degree of priority is low, too. Here, a data rate where the degree of priority is high is so defined that the value thereof is set to a value smaller than that of the data rate where the degree of priority is low. For example, between "$B_2$" and "$C_2$" for the same threshold value "$A_2$", "$B_2$" corresponds to a value smaller than that of "$C_2$". When the data rate is low rather than high, the probability of data error is generally low. Accordingly, in order to reduce the probability of error for the data whose degree of priority is high, the data rates are defined as above.

The data types, such as "video", "data" and "audio" are defined, so that the control unit 30 in the first radio apparatus 10a may convey these data types instead of the degrees of priority described above. In so doing, the same table as that of FIG. 21 is defined for each of the data types. For example, a type of data sensitive to the delay is so defined that the data rate thereof is set lower than that of a type of data resistant to the delay. How many interference sources, namely other radio apparatuses 10, are present in the vicinity of the first radio apparatus 10a, the number of radio apparatuses in the vicinity or the type of codec may be defined instead of the degree of priority.

According to the exemplary embodiment of the present invention, the rate request signal is transmitted in a manner that the information on a desired data rate in the case of transmitting the data is contained therein. Thus, the data rate appropriate for the second radio apparatus can be determined. When the degree of priority is high, the data rate is so determined that the value thereof is lower than that of the data rate where the degree of priority is high. Hence, the probability that the data having the high degree of priority can be transmitted can be enhanced.

Fourth Modification of the First Exemplary Embodiment

A fourth modification of the first exemplary embodiment relates to a processing in which the data rate is changed to a value lower than that of the current data rate, or a processing that accompanies the processing for setting the data rate whose value is lower than that of the data rate contained in the rate information. Changing or setting the data rate is generally done when error occurs in data. If error occurs in data, the occurrence of data error will be reduced by use of a data rate having a lower value. However, the radio channel generally varies with time. There are cases where the variation leads to the improvement of radio channel characteristics. In terms of transmission efficiency, it is preferable that the data rate becomes high as soon as possible.

When the control unit 30 in the first radio apparatus 10a sets a data rate lower than that contained in the rate information sent from the second radio apparatus 10b, the control unit 30 transmits a rate request signal via the processing unit 22. Or, when the control unit 30 sets the data rate to a value lower than that of the current data rate, the control unit 30 transmits the rate request signal via the processing unit 22. It may be said that in such a processing the control unit 30 lowers the data rate and transmits the rate request signal when error occurs.

According to the exemplary embodiment of the present invention, the lower data rate is set and the rate request signal is transmitted. Thus, the rate information suitable for the channel characteristics can be acquired and the period required for the setting of a low data rate can be shortened. Since the period required for the setting of a low data rate can be shortened, the transmission efficiency can be improved.

Fifth Exemplary Embodiment

A fifth exemplary embodiment relates to timing at which the control unit 30 in the first radio apparatus 10a transmits a rate request signal. In the first exemplary embodiment, the first radio apparatus 10a transmits the rate request signal periodically. Discussed here is a case where the rate request signal is not transmitted periodically or a case where the rate request signal is transmitted separately even though the rate request signal is transmitted periodically. The control unit 30 in the first radio apparatus 10a transmits the rate request signal to the second radio apparatus 10b via the processing unit 22. In so doing, the control unit 30 acquires information on data to be transmitted to the second radio apparatus 10b, and determines the transmission of the rate request signal according to the acquired information.

One example of the information on data is the amount of data to be transmitted thereto. And if the acquired amount of data is greater than a threshold value, the control unit 30 will determine the transmission of the rate request signal. When retransmission occurs in the case when the data amount is large, the transmission efficiency drops significantly. On the other hand, even when a low data rate is used in the case when the data amount is large, the transmission efficiency drops significantly. Accordingly, if the data amount is large, the data rate suitable for the then channel characteristics must be set. More specifically, when video data are transmitted, an optimum data rate must be set beforehand; and when audio data are transmitted, the data rate needs not be the optimum data rate because the size thereof is small. The rate request signal is not transmitted if the data amount is small, so that the drop in transmission efficiency as a result of the transmission of the rate request signal is suppressed.

In order to resolve the above problems to be solved, the control unit 30 according to the present exemplary embodiment transmits the rate request signal if the data amount is large. Another example of the information on data is the degree of priority. And if the acquired degree of priority is greater than a threshold value, the control unit 30 will determine the transmission of the rate request signal. The degree of priority is identified by AC, TID and ToS of EDCA. Also, the degree of priority may be identified by QoS assured by AC, TID and ToS of EDCA. A processing following this is the same as that described above and the description thereof is omitted.

Figure 22:
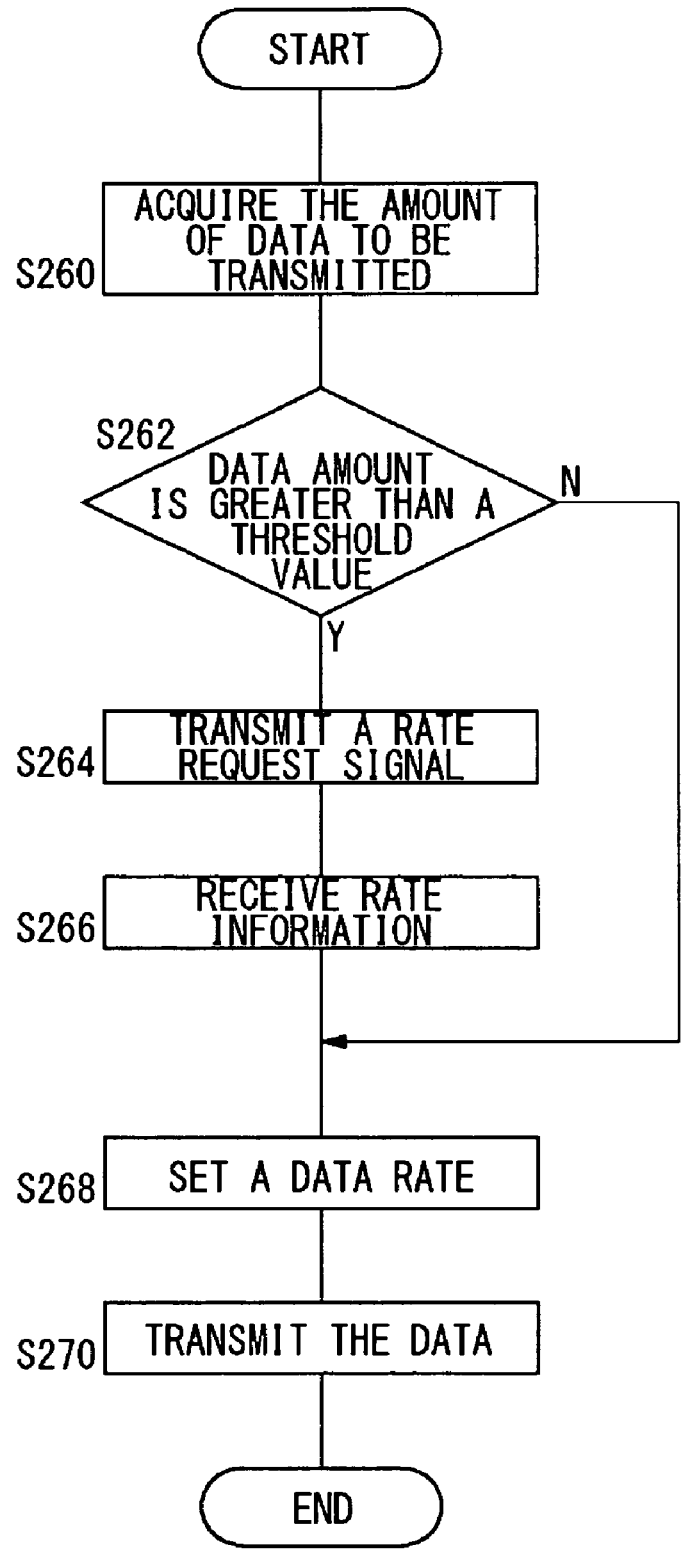
FIG. 22 is a flowchart showing a transmitting procedure according to a fifth exemplary embodiment of the present invention.

FIG. 22 is a flowchart showing a transmitting procedure according to the fifth exemplary embodiment of the present invention. The control unit 30 acquires the amount of data to be transmitted (S260). If the data amount is greater than a threshold value (Y of S262), the control unit 30 will transmit the rate request information via the processing unit 22 and the like (S264) and receive the rate information via the processing unit 22 and the like (S266). If, on the other hand, the data amount is not greater than the threshold value (N of S262), the control unit 30 will acquire the data rate which has already been received, without executing the processings of Step 264 and Step 266. The control unit 30 sets a data rate (S268), and the processing unit 22 transmits the data (S270).

According to the exemplary embodiment of the present invention, the rate request signal is transmitted according to the information on data to be transmitted. Thus the rate information can be updated when necessary. Since the data rate can be set using the latest information when the data amount is large, the transmission efficiency can be improved. Also, the data rate can be set using the latest information when the degree of priority for the data is high, so that data with a high degree of priority can be transmitted with high probability.

Sixth Exemplary Embodiment

A sixth exemplary embodiment of the present invention relates to a case where packet signals are continuously transmitted. When the communication system 100 is a wireless LAN, CSMA (Carrier Sense Multiple Access) is generally used as an access method. In CSMA, a packet signal is transmitted at timing when packet signals are not transmitted from other radio apparatuses 10. However, in order to improve the transmission efficiency, there are cases where it is more preferable that a terminal apparatus receives or transmits a packet signal at the timing specified by the base station apparatus. In this exemplary embodiment, such cases will be discussed.

Figure 23:
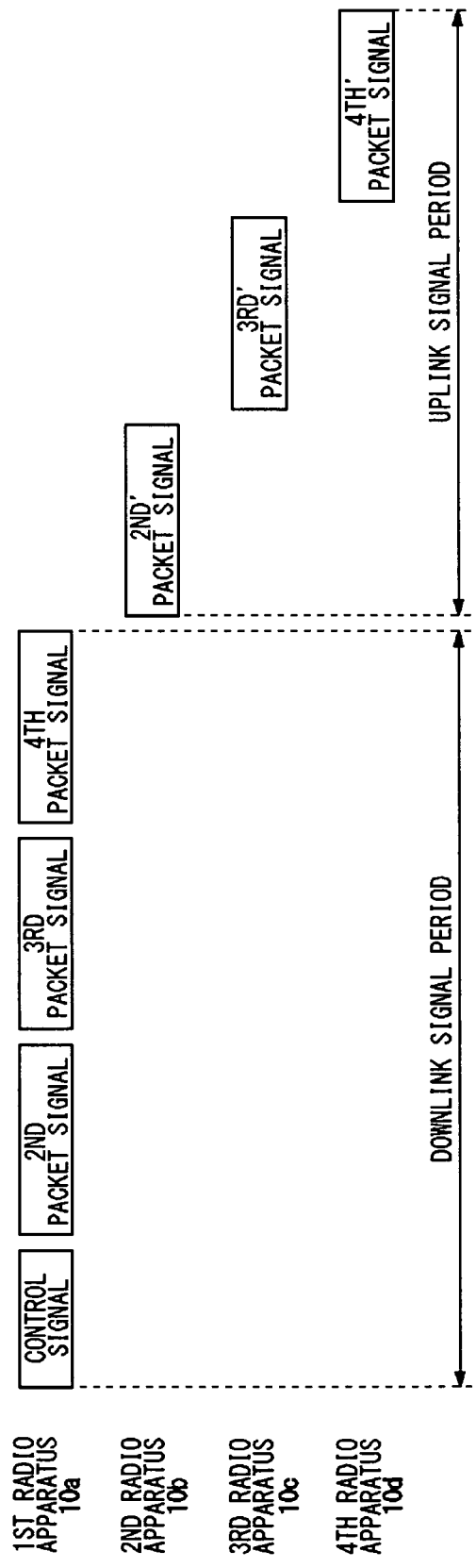
FIG. 23 shows an arrangement of packet signals according to a sixth exemplary embodiment of the present invention.

FIG. 23 shows an arrangement of packet signals according to the sixth exemplary embodiment of the present invention. The Figure shows timings at which the packet signals are transmitted by the first radio apparatus 10a through the fourth radio apparatus 10d, respectively. The first radio apparatus 10a corresponds to the base station apparatus, whereas the second radio apparatus 10b through the fourth radio apparatus 10d correspond to the terminal apparatuses. Accordingly, as shown in the Figure, a period during which the first radio apparatus 10a transmits a packet signal corresponds to a "downlink signal period", whereas a period during which the second radio apparatus 10b through the fourth radio apparatus 10d transmit packet signals corresponds to an "uplink signal period". The first radio apparatus 10a transmits a "control signal". The "control signal" is received by the second radio apparatus 10b through the fourth radio apparatus 10d. The "control signal" contains information on the timing at which the packet signal from the first radio apparatus 10a is to be received by the second radio apparatus 10b through the fourth radio apparatus 10d, respectively, the timings at which the packet signals are to be transmitted to the first radio apparatus 10a, and the length of packet signal. The second radio apparatus 10b through the fourth radio apparatus 10d execute processing according to the information contained in the "control signal".

In the downlink signal period of FIG. 23, the first radio apparatus 10a transmits "second packet signal" through "fourth packet signal" after the "control signal". Here, the "second packet signal" is a packet signal for the second radio apparatus 10b; the "third packet signal" is a packet signal for the third radio apparatus 10c; and the "fourth' packet signal" is a packet signal for the fourth radio apparatus 10d. After the downlink signal period has ended, an uplink signal period is allocated. In the uplink signal period, the second radio apparatus 10b transmits "second' packet signal", the third radio apparatus 10c transmits "third' packet signal", and the fourth radio apparatus 10d transmits "fourth' packet signal". In such circumstances, the first radio apparatus 10a has a rate request signal for the second radio apparatus 10b contained in the "second packet signal", whereas the second radio apparatus 10b has the rate information contained in the "second' packet signal".

According to the exemplary embodiment of the present invention, even in a case when the packet signals are transmitted sequentially to a plurality of terminal apparatuses, a data rate suitable for each of the terminal apparatuses can be used. Since the data rates suitable for a plurality of terminal apparatuses, respectively, are used, the transmission efficiency for each of the plurality of terminal apparatuses can be improved.

Seventh Exemplary Embodiment

A seventh exemplary embodiment relates to identifying the reliability level of rate information. In the first exemplary embodiment, the first radio apparatus 10a identifies the reliability level of the rate information sent from the second radio apparatus 10b. The second radio apparatus 10b according to the seventh exemplary embodiment generates the rate information, also generates the reliability level of the rate information, and transmits these to the first radio apparatus 10a. The control unit 30 in the second radio apparatus 10b receives the rate request signal from the first radio apparatus 10a. The control unit 30 as well as the processing unit 22 generates the rate information which is to correspond to the rate request signal. In so doing, the control unit 30 also generates information on the reliability level of the thus generated rate information.

For example, when the rate information is determined by the received signal strength, the control unit 30 generates information on the reliability level according to the difference between the received signal strength and a threshold value. More specifically, if the difference between the received signal strength and the threshold value is large, the control unit 30 will generate information on the reliability level as "low reliability level". If a predetermined value is fixedly used as rate information, the control unit 30 will generate information on the reliability level as "low reliability level". The control unit 30 transmits the rate information and the information on the reliability level to the first radio apparatus 10a via the processing unit. A processing following this is the same as that described in the first exemplary embodiment and the description thereof is omitted.

According to the exemplary embodiment of the present invention, the information on the reliability level is received together with the rate information, thus eliminating the need of identifying the reliability level. Since the information on the reliability level is also generated together with the rate information, the accuracy of information on the reliability level can be improved.

The present invention has been described based on the exemplary embodiments. These exemplary embodiments are merely exemplary, and it is understood by those skilled in the art that various other modifications to the combination of each constituting element and each process thereof are possible and that such modifications are also within the scope of the present invention.

In the first exemplary embodiment of the present invention, the control unit 30 identifies the reliability level of rate information by deriving the ratio of the number of data which could possibly be transmitted to the number of transmitted data. However, this should not be considered as limiting and, for example, the control unit 30 may identify the reliability level by using another method. The control unit 30 measures the quality of a radio channel between a radio apparatus and a targeted radio apparatus 10, based on the signal received via the radio unit 20, the processing unit 22 and the modem unit 24. Here, the control unit 30 measures the signal strength or delay spread by using a known technique. The control unit 30 stores beforehand a threshold value by which to determine the data rate wherein this threshold value is a threshold value relative to the measurement values. Such a threshold value may be derived by experiments and the like. The control unit 30 derives a data rate suitable for the quality of a radio channel between the radio apparatus and the targeted radio apparatus 10 by comparing the measured quality with the threshold value.

That is, the data rate is derived by itself. Further, the control unit 30 identifies the reliability level of a data rate contained in the rate information, based on the difference between the data rate contained in the rate information and the derived data rate. That is, if both the values are close to each other, the control unit 30 will identify that the reliability level is high; and if they are far apart, it will identify that the reliability level is low. According to this modification, the data rate contained in the rate information is higher than the value suitable for the quality of the radio channel, so that the increase in error can be suppressed. Since the data rate contained in the rate information is lower than the value suitable for the quality of the radio channel, the worsening of frequency utilization efficiency can be suppressed. That is, it suffices whether the data rate contained in the rate information is suitable for the quality of the radio channel or not can be identified.

In connection with the above modification, the following modification is also effective. The control unit 30 may change the data rate contained in the rate information so as to determine the data rate used in the case of transmission. That is, for the radio apparatus 10 whose value of data rate is likely to be higher than the value of the data rate derived from the data rate contained in the rate information, the control unit 30 determines the value of the data rate to be less than that of the data rate contained in the rate information by a predetermined value. When the data rates are compared, the comparison with the derived data rate may be skipped. To check the tendency, the control unit 30 stores the history of data rates derived from the data rates contained in the rate information. On the other hand, if the tendency is opposite, the control unit 30 will determine the value of the data rate to be higher than that of the data rate contained in the rate information by a predetermined value. Further, if no error occurs, it may determine the value of the data rate to be higher than that of the data rate contained in the rate information by a predetermined value. According to this modification, once the tendency of the data rate contained in the rate information received from a predetermined radio apparatus 10 is figured out, the data rate can be determined based on the increase or decrease of the data rate. Thus, the comparison processing can be skipped.

In the third exemplary embodiment, though the control unit 30 has not received the rate request signal, the control unit 30 transmits the rate information to the first radio apparatus 10*a* according to the derived quality. However, this should not be considered as limiting and, for example, the control unit 30 may transmit the rate information at another trigger. The control unit 30 has a timer, and measures a period of time that elapses from the receipt of the rate request signal. If the measured period becomes larger than a predetermined threshold value, the control unit 30 will transmit the rate information to the first radio apparatus 10*a* even though it has not received the rate request signal. In such a case, certain old rate information can be actively replaced with new rate information. That is, it suffice if the radio apparatus 10 that is to transmit the rate information is capable of actively transmitting the rate information.

In the first exemplary embodiment to the fourth exemplary embodiment, the computational result obtained from a decoder, particularly a Viterbi decoder, included in the modem unit 24 may be used in determining the reliability level of rate information or the data rate. For example, the control unit 30 may determine the reliability level of rate information or the data rate according to the size of difference among a plurality of metrics. For example, the difference between the maximum metric value and the second largest metric value may be used. Such a difference is equal to a margin that exists in the current data rate for the channel characteristics. That is, the greater the difference, the more margin will be available. Thus, the control unit 30 can determine the change to a higher data rate. If, on the other hand, the difference is small, less margin is said to be available, so that the control unit 30 can determine the change to a lower data rate. The RSSI, the variation in eigenvalues of a channel characteristic matrix or traveling speed may be used in deciding on the reliability level of rate information or the data rate. According to this modification, information, in the vicinity of an output terminal, on data to be outputted, is used so that the control can be performed rigorously.

In the second exemplary embodiment, when the second radio terminal 10*b*, which is a terminal apparatus here, generates the rate information based on the received beacon and transmits to the base station apparatus a request signal by which to request a communication start, the terminal apparatus also transmits the rate information. However, this should not be considered as limiting and, for example, the rate information may be generated and the thus generated rate information, which needs not be the communication-start request signal, may be sent when a signal required in the case of starting a communication is transmitted. The signal required in the case of starting a communication includes, for example, a signal for an authentication processing. The signal required in the case of starting a communication is not limited thereto and may be a signal which is to be transmitted at an initial stage to a base station apparatus with which the terminal apparatus is about to start a communication from then. According to this modification, the data rate suitable for the channel characteristics is used from the initial stage of a communication, so that the communication can be executed using the data rate suitable for the channel characteristics.

In the first exemplary embodiment, the control unit 30 in the first radio apparatus 10*a* transmits the rate request signal via the processing unit 22 and the like. However, this should not be considered as limiting and, for example, when transmitting the rate request signal, the control unit 30 may transmit a signal requesting a prompt response of rate information. The control unit 30 acquires the degree of priority of data to be transmitted and the information on robustness against delay. And if the acquired degree of priority of rate information is high and the robustness against delay is weak, the control unit 30 will transmit the signal requesting a prompt response of rate information. If the case is opposite, the control unit 30 will not transmit the signal requesting a prompt response of rate information. According to this modification, the case where the prompt response of rate information is requested or the case where the prompt response thereof is not requested can be conveyed to the targeted radio apparatus 10.

In the first exemplary embodiment, the control unit 30 measures the ratio of error contained in the rate information when the data rate was used, in order to identify the reliability level of the rate information. However, this should not be considered as limiting and, for example, the control unit 30 may perform statistical processing on the data rate contained in the rate information, by varying a time constant and may identify the reliability level of the rate information according to the result thereof. The control unit 30 compares a result obtained from a short-term statistical processing performed on the data rate and a result obtained from a long-term statistical processing performed thereon, and identifies the reliability level based on the difference between the two results. For example, if the difference is less than a threshold value, there is a possibility that the second radio apparatus 10*b* outputs a constant value as the rate information regardless of the channel characteristics. Accordingly, in such a case, the control unit 30 identifies that the reliability level is low. According to this modification, the reliability in identifying the reliability level can be improved.

Any arbitrary combination of the first exemplary embodiment to the seventh exemplary embodiment of the present invention is also effective. According to this modification, effects resulting from such a combination is obtained.

INDUSTRIAL APPLICABILITY

According to the present invention, the data rate can be determined depending on the situation.

What is claimed is:
1. A radio apparatus, comprising:
a transmitter which transmits, at a predetermined frequency, a request signal by which to supply information on a data rate to a targeted radio apparatus compatible with a variable data rate;
a receiver which receives from the targeted radio apparatus a response signal, for the request signal, transmitted from said transmitter wherein the response signal contains the information on a data rate; and
a setting unit which sets a data rate used in the case of transmitting data from said transmitter, based on the data rate contained in the response signal received by said receiver,
wherein said transmitter identifies the level of reliability of the information on the data rate contained in the response signal received by said receiver, and lowers the frequency of transmitting the request signal when the level of reliability thereof is low.

2. A radio apparatus according to claim 1, further comprising an acquisition unit which acquires the degree of error of transmitted data when the data, whose data rate is set by said setting unit according to the information on the data rate contained in the response signal received by said receiver, is transmitted from said transmitter,
   wherein said transmitter identifies the reliability level of the information on the data rate contained in the response signal received by said receiver, according to the degree of error acquired by said acquisition unit.

3. A radio apparatus according to claim 1, further comprising:
   a measurement unit which measures the quality of a radio channel between said radio apparatus and the targeted radio apparatus; and
   a derivation unit which derives a data rate suitable for the quality of a radio channel between said radio apparatus and the targeted radio apparatus, based on the quality of a radio channel measured by said measurement unit,
   wherein said transmitter identifies the reliability level of the information on the date rate contained in the response signal received by said receiver, based on a difference between the information on the data rate contained in the response signal received by said receiver and the data rate derived by said derivation unit.

4. A radio apparatus according to claim 1, further comprising a derivation unit which derives a data rate based on information on a radio channel characteristic between said radio apparatus and the targeted radio apparatus, the information having been received by said receiver from the targeted radio apparatus,
   wherein said transmitter identifies the reliability level of the information on the date rate contained in the response signal received by said receiver, based on a difference between the information on the data rate contained in the response signal received by said receiver and the data rate derived by said derivation unit.

5. A radio apparatus according to claim 1, wherein the request signal includes information on a desired rate to be used for data transmission from the radio apparatus to the targeted radio apparatus.

6. A radio apparatus according to claim 1, said transmitter comprising:
   a plurality of antennas; and
   a generator which generates a packet signal to be transmitted from the plurality of antennas, the packet signal containing a plurality of streams,
   wherein when transmitting the request signal, said generator generates the packet signal in a manner such that known signals are contained in streams the number of which is greater than or equal to the number of streams that contain data.

* * * * *